(12) United States Patent
Chang et al.

(10) Patent No.: US 9,372,509 B2
(45) Date of Patent: Jun. 21, 2016

(54) TOUCH PANEL

(71) Applicant: Industrial Technology Research Institute, Hsinchu (TW)

(72) Inventors: Chih-Chia Chang, Hsinchu County (TW); Sin-An Chen, Changhua County (TW); Wei-Yi Lin, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 17 days.

(21) Appl. No.: 14/526,551

(22) Filed: Oct. 29, 2014

(65) Prior Publication Data

US 2015/0241924 A1    Aug. 27, 2015

Related U.S. Application Data

(60) Provisional application No. 61/945,141, filed on Feb. 27, 2014.

(30) Foreign Application Priority Data

Aug. 7, 2014   (TW) .............................. 103127073 A
Sep. 5, 2014   (TW) .............................. 103130776 A

(51) Int. Cl.
*G09G 5/00*    (2006.01)
*G06F 1/16*    (2006.01)
*G06F 3/044*   (2006.01)

(52) U.S. Cl.
CPC .............. *G06F 1/1652* (2013.01); *G06F 3/044* (2013.01); *G06F 2203/04102* (2013.01)

(58) Field of Classification Search
CPC ..... G06F 3/03547; G06F 3/047; G06F 3/044; G06F 2203/04102

USPC .................................................. 345/173–178
See application file for complete search history.

(56) References Cited

U.S. PATENT DOCUMENTS 8,654,095 B1     2/2014  Cho et al.
2005/0253773 A1  11/2005 Sekiguchi
(Continued)

FOREIGN PATENT DOCUMENTS

TW    200903309    1/2009
TW    201310302    3/2013
(Continued)

OTHER PUBLICATIONS

Min Hyung Ahn, et al., "Characteristics of ITO-resistive touch film deposited on a PET substrate by in-line DC magnetron sputtering," Vacuum, vol. 101, Mar. 2014, pp. 221-227.
(Continued)

*Primary Examiner* — Jennifer Nguyen
(74) *Attorney, Agent, or Firm* — Jianq Chyun IP Office

(57) ABSTRACT

A touch panel includes a substrate, first electrodes, second electrodes, third electrodes, and fourth electrodes. The substrate includes a first touch region, a second touch region, and a first touch folding region disposed between the first touch region and the second touch region. The first electrodes extending from the first touch region to the first touch folding region and the second electrodes are disposed in the first touch region on the substrate. The third electrodes extending from the second touch region to the first touch folding region and the fourth electrodes are disposed in the second touch region on the substrate. The first electrodes and the third electrodes are not intersected with one another. A ratio of any side length of the touch panel to a distance between the first touch region and the second touch region is between 9.5 and 95.

26 Claims, 24 Drawing Sheets

(56) References Cited

U.S. PATENT DOCUMENTS

| | | |
|---|---|---|
| 2008/0236905 A1 | 10/2008 | Endo et al. |
| 2008/0284929 A1 | 11/2008 | Kimura |
| 2009/0315854 A1 | 12/2009 | Matsuo |
| 2011/0132642 A1 | 6/2011 | Shinoda et al. |
| 2011/0210937 A1 | 9/2011 | Kee et al. |
| 2012/0162099 A1* | 6/2012 | Yoo .................... G06F 3/0412 345/173 |
| 2012/0306777 A1 | 12/2012 | Kang et al. |
| 2013/0100053 A1 | 4/2013 | Kang et al. |
| 2013/0187833 A1 | 7/2013 | Kim |
| 2013/0277091 A1 | 10/2013 | Chang et al. |
| 2013/0342439 A1 | 12/2013 | Kwack et al. |
| 2014/0034954 A1 | 2/2014 | Yamazaki et al. |
| 2014/0042443 A1 | 2/2014 | Yamazaki |

FOREIGN PATENT DOCUMENTS

| | | |
|---|---|---|
| TW | M448024 | 3/2013 |
| TW | 201316207 | 4/2013 |

OTHER PUBLICATIONS

Shiang-Kuo Chang-Jian, et al., "Fabrication of transparent double-walled carbon nanotubes flexible matrix touch panel by laser ablation technique," Optics & Laser Technology, vol. 43, Issue 8, Nov. 2011, pp. 1371-1376.

Jong-Kwon Lee, et al., "In-cell adaptive touch technology for a flexible e-paper display," Solid-State Electronics, vol. 56, Issue 1, Feb. 2011, pp. 159-162.

Ya-Hsiang Tai, et al., "Active matrix touch sensor detecting time-constant change implemented by dual-gate IGZO TFTs," Solid-State Electronics, vol. 72, Jun. 2012, pp. 67-72.

Yong-Hee Shin, et al., "Resistance and transparency tunable Ag-inserted transparent InZnO films for capacitive touch screen panels," Thin Solid Films, vol. 548, Dec. 2, 2013, pp. 641-645.

Hong-Ki Kim, et al, "Capacitive tactile sensor array for touch screen application," Sensors and Actuators A: Physical, vol. 165, Issue 1, Jan. 2011, pp. 2-7.

"Office Action of Taiwan Related Application No. 103130776," issued on Jan. 12, 2016, p. 1-p. 5.

* cited by examiner

TOUCH PANEL

CROSS-REFERENCE TO RELATED APPLICATION

This application claims the priority benefits of U.S. provisional application Ser. No. 61/945,141, filed on Feb. 27, 2014 and Taiwan application serial no. 103127073, filed on Aug. 7, 2014, and Taiwan application serial no. 103130776, filed on Sep. 5, 2014. The entirety of each of the above-mentioned patent applications is hereby incorporated by reference herein and made a part of this specification.

TECHNICAL FIELD

The disclosure provides a touch panel, and related to a foldable touch panel.

BACKGROUND

In the application of a conventional flexible touch panel, electrode structures disposed in the folding portion in the touch panel may be damaged due to prolonged bending or folding, thus causing the resistance value sensed by the whole touch panel to be increased. Moreover, if the resistance value of the electrode structures of the touch panel is increased and reaches a certain value, in the worse case, the touch signal cannot be successfully transmitted and received, thus causing functional failure of the touch panel. Therefore, how to increase the durability and the stability of the flexible touch panel under the use of repeated bending or folding is one of the urgent issues that need to be solved.

SUMMARY

The disclosure provides a touch panel. The touch panel includes a substrate, a plurality of first electrodes, a plurality of second electrodes, a plurality of third electrodes, and a plurality of fourth electrodes. The substrate includes a first touch region, a second touch region, and a first touch folding region. The first touch folding region is disposed between the first touch region and the second touch region. The plurality of first electrodes and the plurality of second electrodes are disposed in the first touch region on the substrate, the first electrodes and the second electrodes are intersected with one another, and the first electrodes are extended from the first touch region to the first touch folding region. The plurality of third electrodes and the plurality of fourth electrodes are disposed in the second touch region on the substrate, the third electrodes and the fourth electrodes are intersected with one another, and the third electrodes are extended from the second touch region to the first touch folding region. The first electrodes and the third electrodes are not intersected with one another, and the ratio of any side length of the touch panel to a distance between the first touch folding region and the second touch region is between 9.5 and 95.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
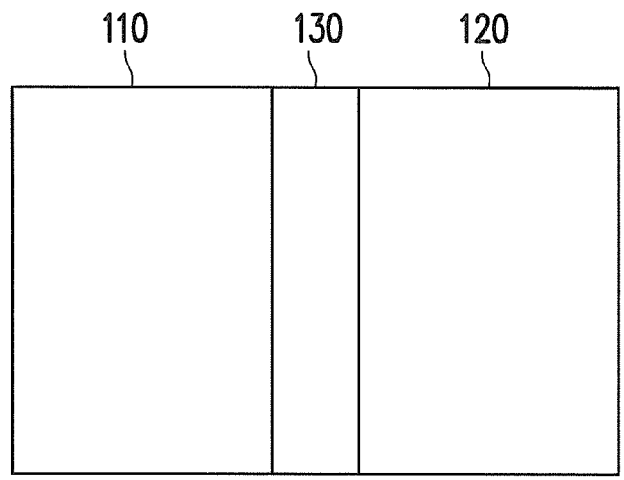
FIG. 1A is a schematic of an unfolded touch panel of the disclosure.
Figure 1B:
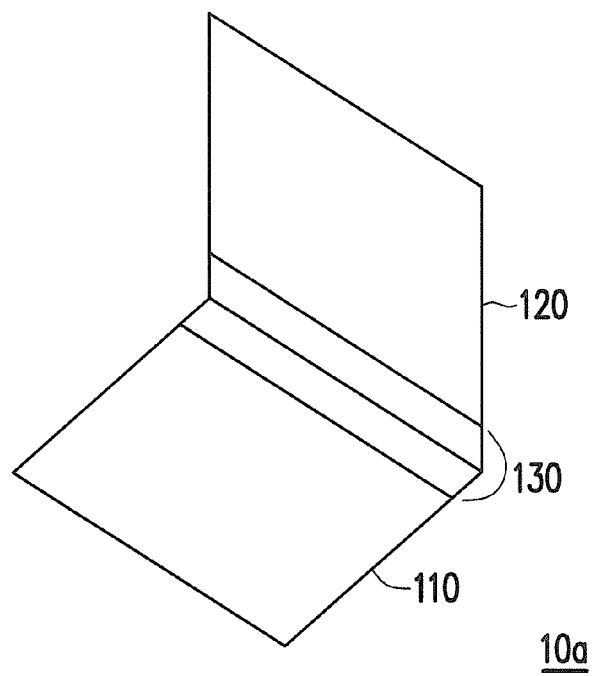
FIG. 1B is a schematic of a folded touch panel of the disclosure.
Figure 1C:
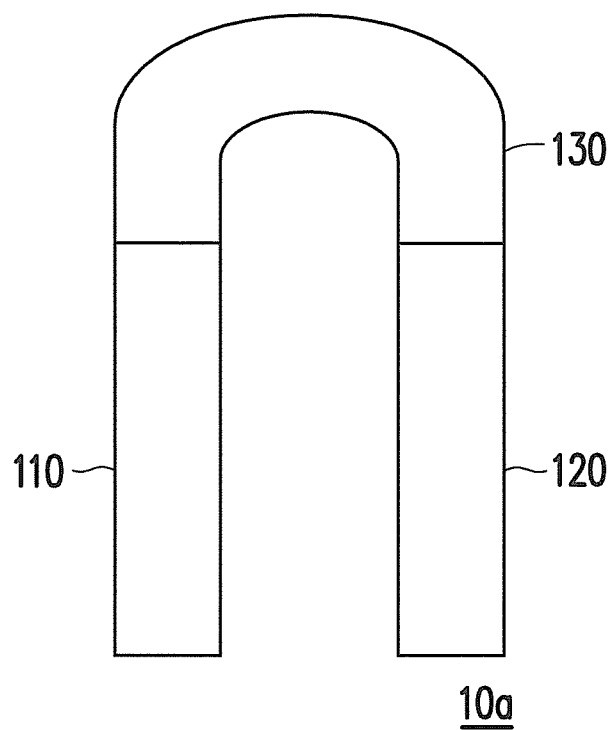
FIG. 1C is a cross-sectional schematic of a folded touch panel of the disclosure.

FIG. 1A is a schematic of an unfolded touch panel of the disclosure, FIG. 1B is a schematic of a folded touch panel of the disclosure, and FIG. 1C is a cross-sectional schematic of a folded touch panel of the disclosure. In general, when a touch panel 10a is used, the touch panel 10a can be used in an unfolded configuration as shown in FIG. 1A. A first touch folding region 130 is located between a first touch region 110 and a second touch region 120. Moreover, when the touch panel 10a is used, the touch panel 10a can also be used in a folded configuration as shown in FIG. 1B. The first touch folding region 130 is in a folded state. More specifically, the touch panel 10a can further be folded as shown in FIG. 1C. Accordingly, in the touch panel 10a of the disclosure, various electrode designs in the first touch folding region 130 are mainly provided. For example, a non-bridged electrode design is used, and in the non-bridged electrode design, different electrodes are not intersected with one another, and therefore an insulation pad does not need to be disposed between different electrodes for electric insulation. In other words, the same electrode does not need to be connected by a bridged method in the portion in which the electrode is overlapped with the insulation pad. Accordingly, the electrode structures in the first touch folding region 130 of the touch panel 10a may are less readily damaged under prolonged use of bending or folding. The non-bridged electrode design can be formed by the extension of the electrodes in the first touch regions 110 and the second touch region 120 on two sides of the first touch folding region 130. For example, the electrodes of the first touch region 110 and the second touch region 120 are staggered with one another, and therefore the effect of touch sensing in the first touch folding region 130 can be improved. Moreover, the electrodes in the first touch folding region 130 can be fabricated by a conductive material having greater ductility. As a result, the electrode structures in the first touch folding region 130 of the touch panel 10a may are still not readily damaged under prolonged use of bending or folding. In the following, specific description is provided with various embodiments.

Figure 2A:
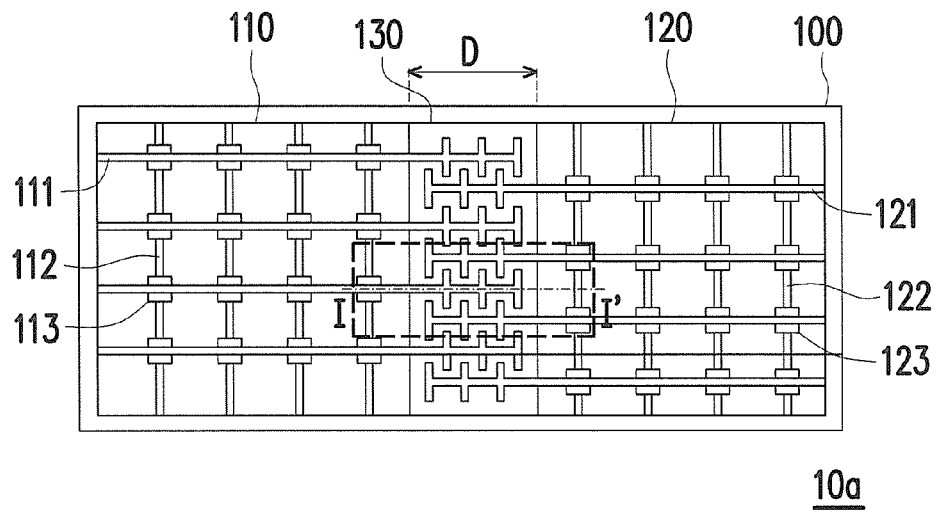
FIG. 2A is a schematic of a touch panel of an embodiment of the disclosure.
Figure 2B:
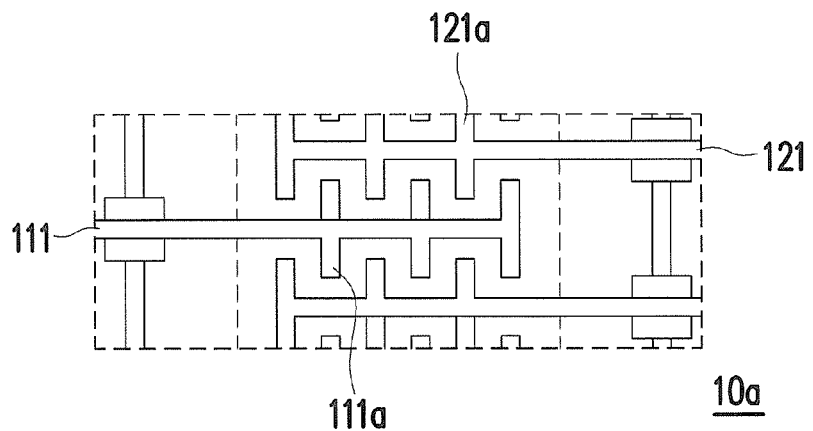
FIG. 2B is an enlarged schematic of a portion of the touch panel of FIG. 2A.
Figure 2C:
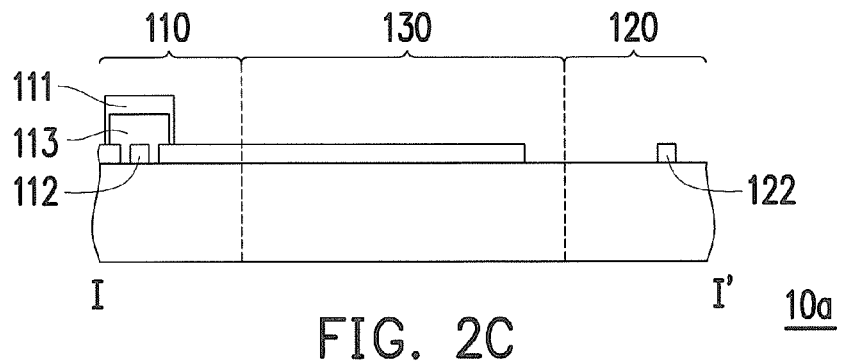
FIG. 2C is a cross-sectional schematic of the touch panel of FIG. 2A along line I-I'.

FIG. 2A is a schematic of a touch panel of an embodiment of the disclosure. FIG. 2B is an enlarged schematic of a portion of the touch panel of FIG. 2A. FIG. 2C is a cross-sectional schematic of the touch panel of FIG. 2A along line I-I'. Referring to FIG. 2A, FIG. 2B, and FIG. 2C, the touch panel 10a of the present embodiment includes a substrate 100, a plurality of first electrodes 111, a plurality of second electrodes 112, a plurality of third electrodes 121, and a plurality of fourth electrodes 122.

Specifically, the substrate 100 includes a first touch region 110, a second touch region 120, and a first touch folding region 130. The first touch folding region 130 is disposed between the first touch region 110 and the second touch region 120. The plurality of first electrodes 111 and the plurality of second electrodes 112 are disposed in the first touch region 110 on the substrate 100, and the first electrodes 111 and the second electrodes 112 are intersected with one another. The plurality of third electrodes 121 and the plurality of fourth electrodes 122 are disposed in the second touch region 120 on the substrate 100, and the third electrodes 121 and the fourth electrodes 122 are intersected with one another. A distance D between the first touch region 110 and the second touch region 120 is between 3.14 mm and 47.1 mm, one of the side lengths of the touch panel 10a is between 40 mm and 300 mm, and another side length is between 30 mm and 225 mm. Accordingly, the ratio of any side length of the touch panel 10a to the distance D between the first touch region 110 and the second touch region 120 is between 9.5 and 95.

In the present embodiment, the first electrodes 111 in the touch panel 10a are further extended from the first touch region 110 to the first touch folding region 130, the third electrodes 121 are further extended from the second touch region 120 to the first touch folding region 130, and the first electrodes 111 and the third electrodes 121 are not intersected with one another. For example, the first electrodes 111 and the third electrodes 121 are staggered with one another in the first touch folding region 130. By the staggered arrangement of the first electrodes 111 and the third electrodes 121 in the first touch folding region 130, the capacitance value of the mutual capacitance of the first electrodes 111 and the third electrodes 121 can be changed, such that the first electrodes 111 and the third electrodes 121 can have the effect of good capacitance matching so that the object of good touch sensing is achieved.

It should be mentioned here that, the first touch folding region 130 can also include at least one non-touch region. In other words, the first electrodes 111 and the third electrodes 121 can optionally be partially disposed in the first touch folding region 130 according to the usage demand of the touch region. For ease of description, the entire first touch folding region 130 is made up of touch regions in the figures, but these figures are not intended to limit the disclosure.

More specifically, in the present embodiment, each of the first electrodes 111 of the touch panel 10a further contains at least one first sub-electrode 111a in the first touch folding region 130, and each of the first sub-electrodes 111a is extended from the first electrode 111 toward the direction of the adjacent third electrodes 121. Moreover, each of the third electrodes 121 further contains at least one third sub-electrode 121a in the first touch folding region 130, and the third sub-electrode 121a is extended from the third electrode 121 toward the direction of the adjacent first electrodes 111. The first sub-electrode 111a and the third sub-electrode 121a are not intersected with each other. For example, the first sub-electrode 111a and the third sub-electrode 121a are staggered with each other in the first touch folding region 130. By the staggered disposition of the first sub-electrode 111a and the third sub-electrode 121a in the first touch folding region 130, the capacitance value of the mutual capacitance of the first electrodes 111 and the third electrodes 121 can be changed, such that the first electrodes 111 and the third electrodes 121 can have good effect of capacitance matching so that the object of good touch sensing is achieved.

In addition, insulation pads 113 and 123 are further disposed between the first electrodes 111 and the second electrodes 112 intersected with one another and the third electrodes 121 and the fourth electrodes 122 intersected with one another. The insulation pads 113 and 123 can be used for electric insulation between the first electrodes 111 and the second electrodes 112 and can be used for electric insulation between the third electrodes 121 and the fourth electrodes 122, and will be no longer repeatedly described.

It should be mentioned that, the shape and the quantity of all of the electrodes shown in FIG. 2A, FIG. 2B, and FIG. 2C are only exemplary and are not intended to limit the disclosure. The electrodes can be a series of strip electrodes or a series of diamond-shaped electrodes, and the shape of each of the sub-electrodes can be a strip, a triangle, or any other polygon. Moreover, the size and the shape of each of the first touch region 110 and the second touch region 120 shown in FIG. 2A, FIG. 2B, and FIG. 2C are only exemplary and are not intended to limit the disclosure. The size of each of the first touch region 110 and the second touch region 120 can be the same or different, and the shape of each of the first touch region 110 and the second touch region 120 can be a rectangle, a triangle, or any other polygon. For ease of description, all of the electrodes and all of the sub-electrodes are strips and the shapes of the touch regions are all rectangles in the schematics in the following as example.

In the present embodiment, the electrodes disposed in the first touch folding region 130 can be selected from the group consisting of a metal mesh layer, a nano-conductive material layer, a transparent conductive oxide layer, a polymer conductive layer, and a combination thereof. For instance, the nano-conductive material layer can include carbon nanotube and silver nanowire, and the transparent conductive oxide layer can include indium tin oxide, aluminum-doped zinc oxide, zinc oxide, gallium-doped zinc oxide, indium oxide, indium zinc oxide, titanium dioxide, fluorine-doped tin oxide, tin dioxide, cadmium oxide, and the polymer conductive layer can include poly(3,4-ethylenedioxythiophene)-poly(styrenesulfonate). In this way, regardless of whether a single-layer material or a multi-layer material is used as the electrodes, since the materials used all have the characteristic of good ductility, the electrode structures in the first touch folding region 130 may are less readily damaged when the touch panel is used under repeated bending or folding, such that the touch panel has better durability. Moreover, when a multi-layer material is used as the electrodes, the resistance of the electrodes can further be effectively reduced such that the effect of good touch sensing is achieved.

Based on the above, in the touch panel 10a of the present embodiment, the first electrodes 111 and the second electrodes 112 intersected with one another are respectively disposed in the first touch region 110 on the substrate 100, and the third electrodes 121 and the fourth electrodes 122 intersected with one another are disposed in the second touch region 120 on the substrate 100. In other words, electrode structures intersected with one another are not disposed in the first touch folding region 130. Therefore, even if the touch panel 10a is used under repeated bending or folding, the electrode structures can be less readily damaged, such that the touch panel 10a has better durability. Moreover, the first electrodes 111 and the third electrodes 121 are further respectively extended from the first touch region 110 and the second touch region 120 to the first touch folding region 130, and are staggered with one another in the first touch folding region 130. Accordingly, even if the first electrodes 111 and the second electrodes 112 intersected with one another and the third electrodes 121 and the fourth electrodes 122 intersected with one another are not disposed in the first touch folding region 130 of the touch panel 10a, the touch panel 10a can still have the effect of good touch sensing. More specifically, in the touch panel 10a, each of the first electrodes 111 further contains at least one first sub-electrode 111a in the first touch folding region 130, each of the third electrodes 121 further contains at least one third sub-electrode 121a in the first touch folding region 130, and the first sub-electrode 111a and the third sub-electrode 121a are staggered with each other in the first touch folding region 130. As a result, the touch panel 10a can further have the effect of good touch sensing, thus increasing the stability of touch sensing thereof.

Figure 3A:
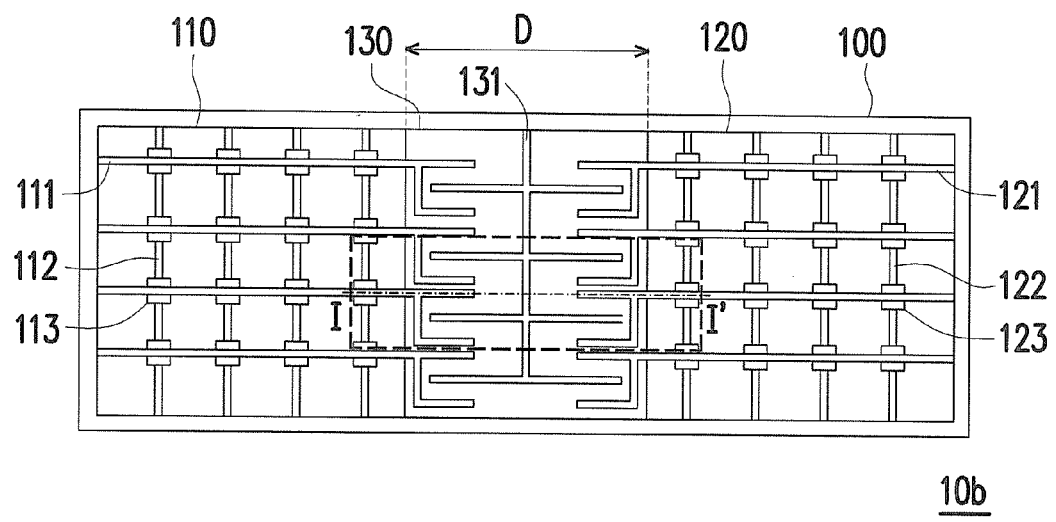
FIG. 3A is a schematic of a touch panel of another embodiment of the disclosure.
Figure 3B:
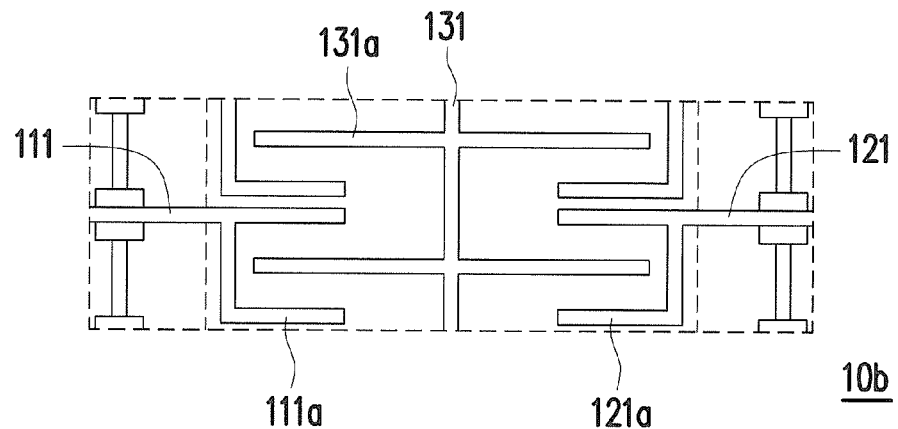
FIG. 3B is an enlarged schematic of a portion of the touch panel of FIG. 3A.
Figure 3C:
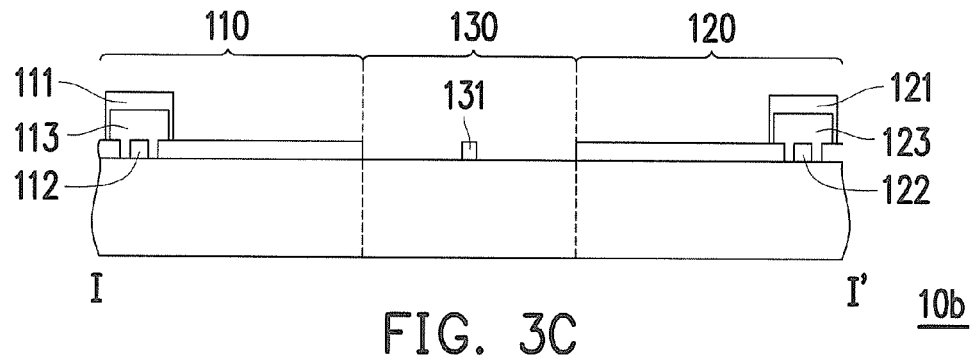
FIG. 3C is a cross-sectional schematic of the touch panel of FIG. 3A along line I-I'.

FIG. 3A is a schematic of a touch panel of another embodiment of the disclosure. FIG. 3B is an enlarged schematic of a portion of the touch panel of FIG. 3A. FIG. 3C is a cross-sectional schematic of the touch panel of FIG. 3A along line I-I'. Referring to FIG. 3A, FIG. 3B, and FIG. 3C, in the present embodiment, a touch panel 10b is similar to the touch panel 10a, and similar components thereof are labeled with the same reference numerals and have similar functions, and are therefore not repeated herein. The main difference between the touch panel 10b and the touch panel 10a is that the touch panel 10b further includes a first compensation electrode 131. The first compensation electrode 131 is disposed in the first touch folding region 130 and between the first electrodes 111 and the third electrodes 121.

In the present embodiment, the first compensation electrode 131 in the touch panel 10b further contains a plurality of first compensation sub-electrodes 131a, a portion of the first compensation sub-electrodes 131a is extended from the first compensation electrode 131 toward the direction of the first touch region 110, and is between the adjacent first electrodes 111; and another portion of the first compensation sub-electrodes 131a is extended from the first compensation electrode 131 toward the direction of the second touch region 120, and is between the adjacent third electrodes 121. In other words, each of the first compensation sub-electrodes 131a is respectively staggered with the first electrodes 111 and the third electrodes 121. By the staggered disposition of the first electrodes 111, the third electrodes 121, and the first compensation sub-electrodes 131a in the first touch folding region 130, the capacitance value of the mutual capacitance of the first electrodes 111, the third electrodes 121, and the first compensation sub-electrode 131a can be changed, such that the first electrodes 111, the third electrodes 121, and the first compensation sub-electrodes 131a can have the effect of good capacitance matching, so that the object of good touch sensing is achieved.

More specifically, in the present embodiment, each of the first electrodes 111 of the touch panel 10b further contains at least one first sub-electrode 111a in the first touch folding region 130, and a portion of the first compensation sub-electrodes 131a is between the first sub-electrode 111a and the first electrodes 111. Moreover, each of the third electrodes 121 further contains at least one third sub-electrode 121a in the first touch folding region 130, and another portion of the first compensation sub-electrodes 131a is between the third sub-electrode 121a and the third electrodes 121. In other words, each of the first compensation sub-electrodes 131a is respectively staggered with the first electrodes 111 and the first sub-electrode 111a, or staggered with the third electrodes 121 and the third sub-electrode 121a. By the staggered disposition of the first electrodes 111, the first sub-electrode 111a, the third electrodes 121, the third sub-electrode 121a, and the first compensation sub-electrodes 131a in the first touch folding region 130, the first electrodes 111, the third electrodes 121, and the first compensation sub-electrodes 131a can further have the effect of good capacitance matching, such that the object of good touch sensing is achieved.

In this way, in the touch panel 10b of the present embodiment, the first electrodes 111 and the second electrodes 112 intersected with one another and the third electrodes 121 and the fourth electrodes 122 intersected with one another are respectively disposed in the first touch region 110 and the second touch region 120 on the substrate 100. In other words, electrode structures intersected with one another are not disposed in the first touch folding region 130. Therefore, even if the touch panel 10b is used under repeated bending or folding, the electrode structures can be less readily damaged, such that the touch panel 10b has better durability. Moreover, the first compensation electrode 131 further contains a plurality of first compensation sub-electrodes 131a, and each of the first compensation sub-electrodes 131a is respectively staggered with the first electrodes 111 and the third electrodes 121. Accordingly, by the staggered disposition of the first electrodes 111, the third electrodes 121, and the first compensation sub-electrodes 131a in the first touch folding region 130, the touch panel 10b can achieve the effect of good touch sensing. More specifically, in the touch panel 10b, each of the first electrodes 111 further contains at least one first sub-electrode 111a in the first touch folding region 130, each of the third electrodes 121 further contains at least one third sub-electrode 121a in the first touch folding region 130, and each of the first compensation sub-electrodes 131a is staggered with the first electrodes 111 and the first sub-electrode 111a, or staggered with the third electrodes 121 and the third sub-electrode 121a. As a result, the touch panel 10b can further have the effect of good touch sensing, thus increasing the stability of the touch sensing thereof.

Figure 4A:
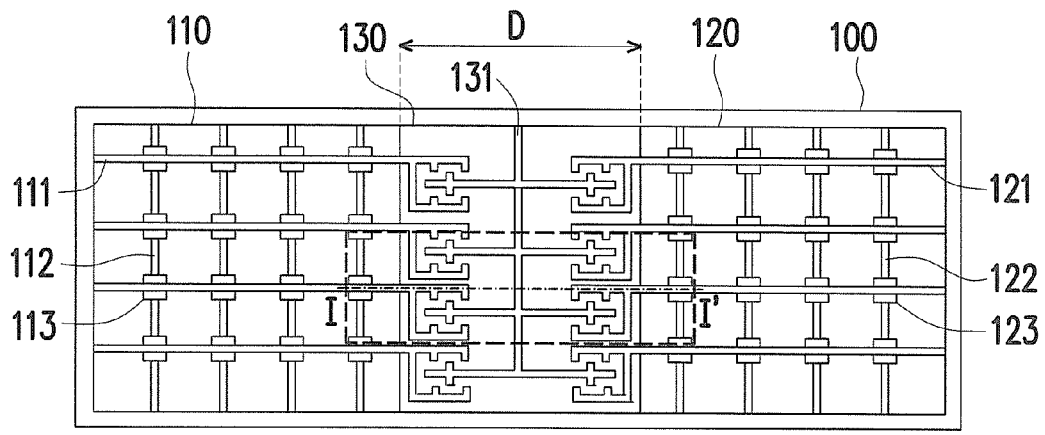
FIG. 4A is a schematic of a touch panel of yet another embodiment of the disclosure.
Figure 4B:
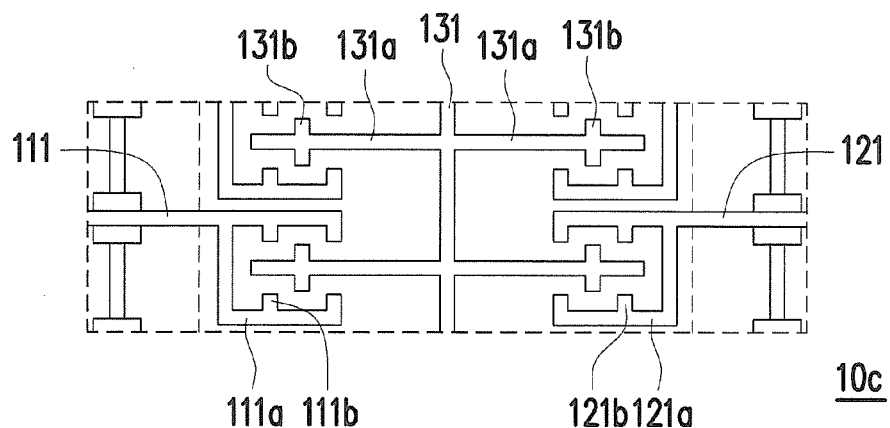
FIG. 4B is an enlarged schematic of a portion of the touch panel of FIG. 4A.
Figure 4C:
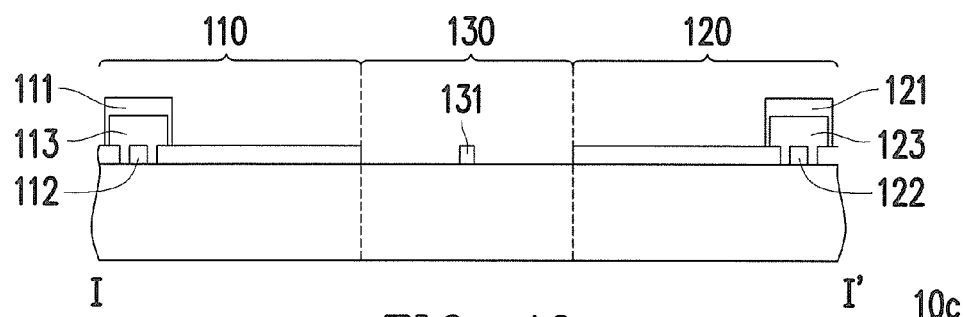
FIG. 4C is a cross-sectional schematic of the touch panel of FIG. 4A along line I-I'.

FIG. 4A is a schematic of a touch panel of yet another embodiment of the disclosure. FIG. 4B is an enlarged schematic of a portion of the touch panel of FIG. 4A. FIG. 4C is a cross-sectional schematic of the touch panel of FIG. 4A along line I-I'. Referring to FIG. 4A, FIG. 4B, and FIG. 4C, in the present embodiment, a touch panel 10c is similar to the touch panel 10b, and similar components thereof are labeled with the same reference numerals and have similar functions, and are therefore not repeated herein. The main difference between the touch panel 10c and the touch panel 10b is that the touch panel 10c further includes a plurality of second compensation sub-electrodes 131b, a portion of the second compensation sub-electrodes 131b is extended from the first compensation sub-electrodes 131a toward the direction of the first sub-electrode 111a and the first electrodes 111, and is between the adjacent first electrodes 111 and the first sub-electrode 111a; and another portion of the second compensation sub-electrodes 131b is extended from the first compensation sub-electrodes 131a toward the direction of the third sub-electrode 121a and the third electrodes 121, and is between the adjacent third electrodes 121 and the third sub-electrode 121a.

More specifically, in the present embodiment, each of the first electrodes 111 in the touch panel 10c further contains a plurality of second sub-electrodes 111b in the first touch folding region 130, a portion of the second sub-electrodes 111b is extended from the first electrodes 111 toward the direction of the adjacent first compensation sub-electrodes 131a, another portion of the second sub-electrodes 111b is extended from the first sub-electrode 111a toward the direction of the adjacent first compensation sub-electrodes 131a; each of the third electrodes 121 further contains a plurality of fourth sub-electrodes 121b in the first touch folding region 130, a portion of the fourth sub-electrodes 121b is extended from the second electrodes 112 toward the direction of the adjacent first compensation sub-electrodes 131a, and another portion of the fourth sub-electrodes 121b is extended from the third sub-electrode 121a toward the direction of the adjacent first compensation sub-electrodes 131a. For example, each of the second sub-electrodes 111b and each of the second compensation sub-electrodes 131b are staggered with one another, and each of the fourth sub-electrodes 121b and each of the second compensation sub-electrodes 131b are staggered with one another. By the staggered disposition of each of the second sub-electrodes 111b, each of the fourth sub-electrodes 121b, and each of the second compensation sub-electrodes 131b in the first touch folding region 130, the capacitance value of the mutual capacitance of the first electrodes 111, the third electrodes 121, and the first compensation electrode 131 can be changed, such that the first electrodes 111, the third electrodes 121, and the first compensation electrodes 131 can have the effect of good capacitance matching, so that the object of good touch sensing is achieved.

In the touch panel 10c of the present embodiment, the first electrodes 111 and the second electrodes 112 intersected with one another and the third electrodes 121 and the fourth electrodes 122 intersected with one another are respectively disposed in the first touch region 110 and the second touch region 120 on the substrate 100. In other words, electrode structures intersected with one another are not disposed in the first touch folding region 130. Therefore, even if the touch panel 10c is used under repeated bending or folding, the electrode structures can be less readily damaged, such that the touch panel 10c has better durability. More specifically, the touch panel 10c further includes a plurality of second compensation sub-electrodes 131b, each of the first electrodes 111 further contains a plurality of second sub-electrodes 111b in the first touch folding region 130, and each of the third electrodes 121 further contains a plurality of fourth sub-electrodes 121b in the first touch folding region 130. Each of the second sub-electrodes 111b and each of the second compensation sub-electrodes 131b are staggered with one another, and each of the fourth sub-electrodes 121b and each of the second compensation sub-electrodes 131b are staggered with one another. In this way, by the staggered disposition of each of the second sub-electrodes 111b and each of the second compensation sub-electrodes 131b and the staggered disposition of each of the fourth sub-electrodes 121b and each of the second compensation sub-electrodes 131b in the first touch folding region 130 of the touch panel 10c, the effect of good touch sensing can be achieved, and the stability of touch sensing thereof can be increased.

Figure 5A:
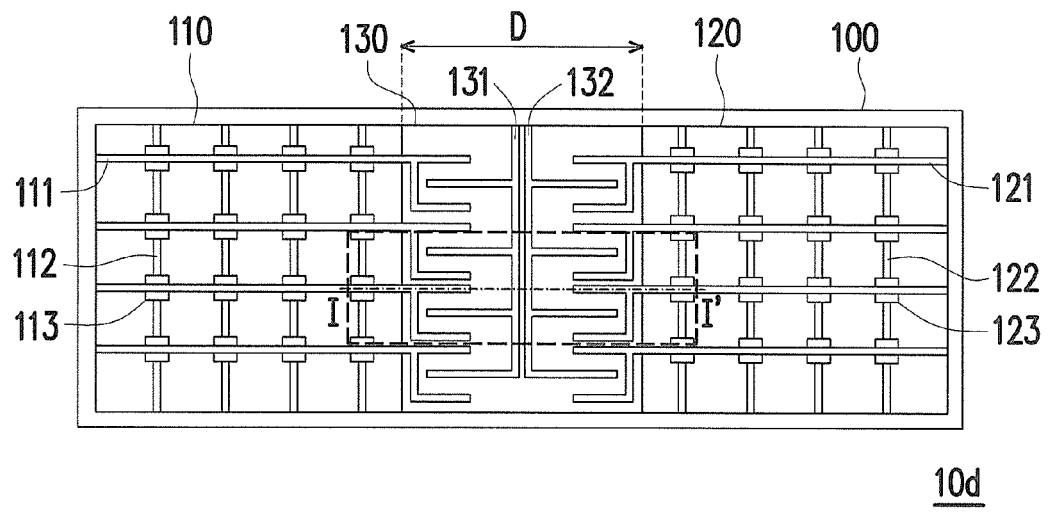
FIG. 5A is a schematic of a touch panel of still yet another embodiment of the disclosure.
Figure 5B:
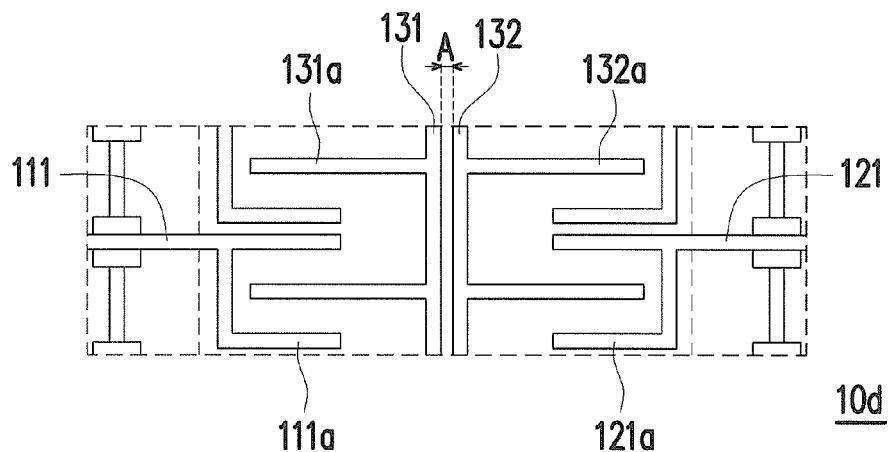
FIG. 5B is an enlarged schematic of a portion of the touch panel of FIG. 5A.
Figure 5C:
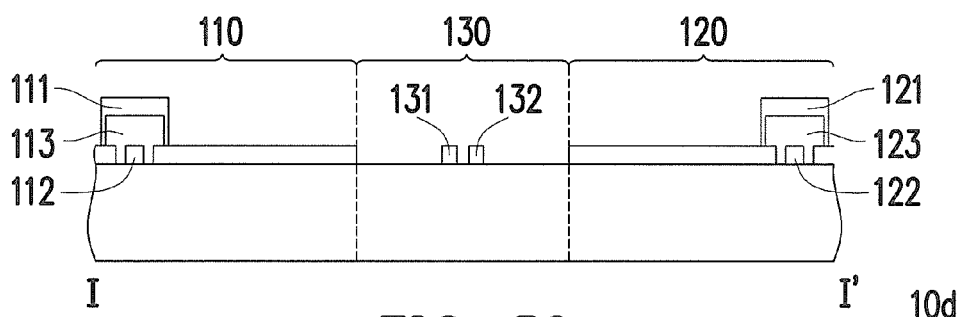
FIG. 5C is a cross-sectional schematic of the touch panel of FIG. 5A along line I-I'.

FIG. 5A is a schematic of a touch panel of still yet another embodiment of the disclosure. FIG. 5B is an enlarged schematic of a portion of the touch panel of FIG. 5A. FIG. 5C is a cross-sectional schematic of the touch panel of FIG. 5A along line I-I'. Referring to FIG. 5A, FIG. 5B, and FIG. 5C, in the present embodiment, a touch panel 10d is similar to the touch panel 10b, and similar components thereof are labeled with the same reference numerals and have similar functions, and are therefore not repeated herein. The main difference between the touch panel 10d and the touch panel 10b is that the touch panel 10d further includes a second compensation electrode 132. The second compensation electrode 132 is disposed in the first touch folding region 130 and between the first compensation electrode 131 and the third electrodes 121.

A distance A between the first compensation electrode 131 and the second compensation electrode 132 can be between 0.01 mm and 5 mm. Since electrodes are not disposed in the distance A between the first compensation electrode 131 and the second compensation electrode 132, the electrode structures in the first touch folding region 130 are less readily damaged when the touch panel 10d is used under repeated bending or folding, such that the touch panel 10d has better durability.

In the present embodiment, the first compensation electrode 131 in the touch panel 10d further contains a plurality of first compensation sub-electrodes 131a, the first compensation sub-electrodes 131a are extended from the first compensation electrode 131 toward the direction of the first touch region 110, and is between the adjacent first electrodes 111; and the second compensation electrode 132 further contains a plurality of third compensation sub-electrodes 132a, the third compensation sub-electrodes 132a are extended from the second compensation electrode 132 toward the direction of the second touch region 120, and is between the adjacent third electrodes 121. In other words, each of the first compensation sub-electrodes 131a and the first electrodes 111 are staggered with one another and each of the third compensation sub-electrodes 132a and the third electrodes 121 are staggered with one another. By the staggered disposition of the first compensation sub-electrodes 131a and the first electrodes 111 and the staggered disposition of the third compensation sub-electrodes 132a and the third electrodes 121, the capacitance value of the mutual capacitance of the first electrodes 111, the third electrodes 121, the first compensation sub-electrodes 131a, and the third compensation sub-electrodes 132a can be changed, such that the first electrodes 111, the third electrodes 121, the first compensation sub-electrodes 131a, and the third compensation sub-electrodes 132a can have the effect of good capacitance matching, so that the object of good touch sensing is achieved.

More specifically, in the present embodiment, each of the first electrodes 111 of the touch panel 10d further contains at least one first sub-electrode 111a in the first touch folding region 130, and each of the first compensation sub-electrodes 131a is between the first sub-electrode 111a and the first electrodes 111. Moreover, each of the third electrodes 121 further contains at least one third sub-electrode 121a in the first touch folding region 130, and each of the third compensation sub-electrodes 132a is between the third sub-electrode 121a and the third electrodes 121. In other words, each of the first compensation sub-electrodes 131a is respectively staggered with the first electrodes 111 and the first sub-electrode 111a, and each of the third compensation sub-electrodes 132a is respectively staggered with the third electrodes 121 and the third sub-electrode 121a. Each of the first compensation sub-electrodes 131a is respectively staggered disposition with the first electrodes 111 and the first sub-electrode 111a, and each of the third compensation sub-electrodes 132a is respectively staggered disposition with the third electrodes 121 and the third sub-electrode 121a, the first electrodes 111, the third electrodes 121, the first compensation electrode 131, and the second compensation electrode 132 can have the effect of good capacitance matching, such that the object of good touch sensing is achieved.

In this way, in the touch panel 10d of the present embodiment, the first electrodes 111 and the second electrodes 112 intersected with one another and the third electrodes 121 and the fourth electrodes 122 intersected with one another are respectively disposed in the first touch region 110 and the second touch region 120 on the substrate 100. In other words, electrode structures intersected with one another are not disposed in the first touch folding region 130. Therefore, even if the touch panel 10d is used under repeated bending or folding, the electrode structures can be less readily damaged, such that the touch panel 10d has better durability. Moreover, since electrodes are not disposed in the distance A between the first compensation electrode 131 and the second compensation electrode 132, the electrode structures in the first touch folding region 130 may be less readily damaged when the touch panel 10d is used under repeated bending or folding, such that the touch panel 10d has better durability. Moreover, the first compensation electrode 131 further contains a plurality of first compensation sub-electrodes 131a, the second compensation electrode 132 further contains a plurality of third compensation sub-electrodes 132a, each of the first compensation sub-electrodes 131a and the first electrodes 111 are staggered with one another, and each of the third compensation sub-electrodes 132a and the third electrodes 121 are staggered with one another. Accordingly, in the first touch folding region 130 of the touch panel 10d, by the staggered disposition of each of the first compensation sub-electrodes 131a and the first electrodes 111 and the staggered disposition of each of the third compensation sub-electrodes 132a and the third electrodes 121, the effect of good touch sensing can be achieved. More specifically, in the touch panel 10d, each of the first electrodes 111 further contains at least one first sub-electrode 111a in the first touch folding region 130, each of the third electrodes 121 further contains at least one third sub-electrode 121a in the first touch folding region 130, each of the first compensation sub-electrodes 131a is respectively staggered with the first electrodes 111 and the first sub-electrode 111a, and each of the third compensation sub-electrodes 132a is respectively staggered with the third electrodes 121 and the third sub-electrode 121a. As a result, the touch panel 10d can further have the effect of good touch sensing, thus increasing the stability of touch sensing thereof.

Figure 6A:
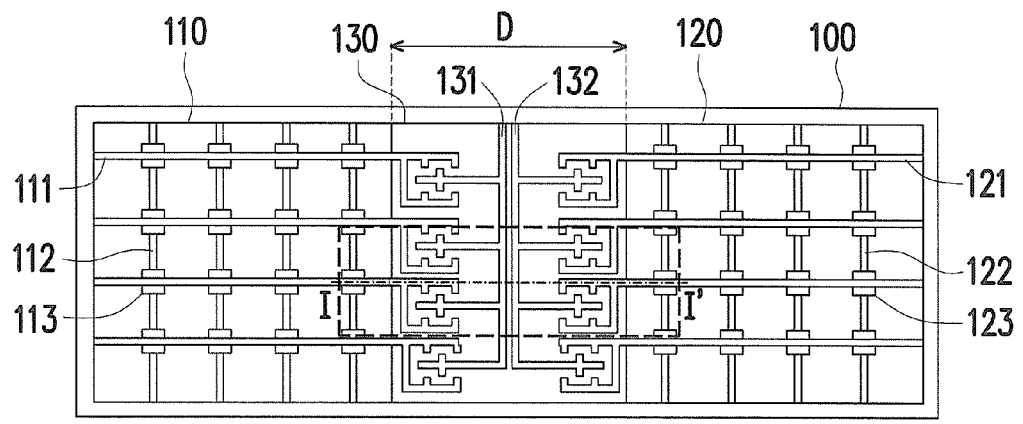
FIG. 6A is a schematic of a touch panel of another embodiment of the disclosure.
Figure 6B:
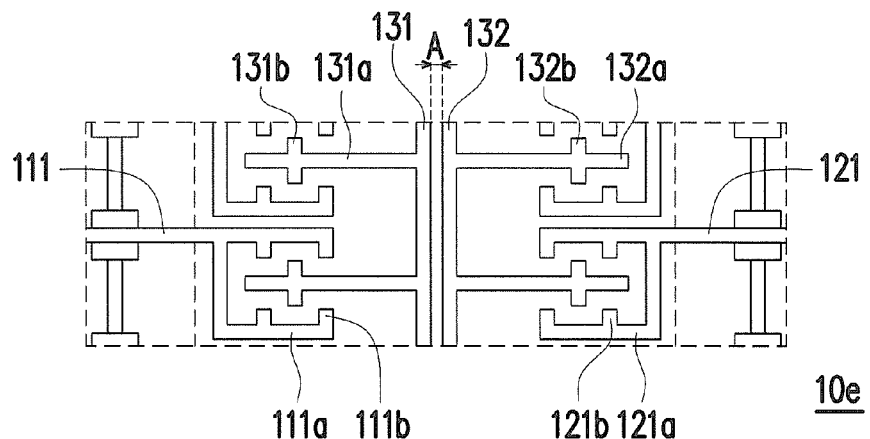
FIG. 6B is an enlarged schematic of a portion of the touch panel of FIG. 6A.
Figure 6C:
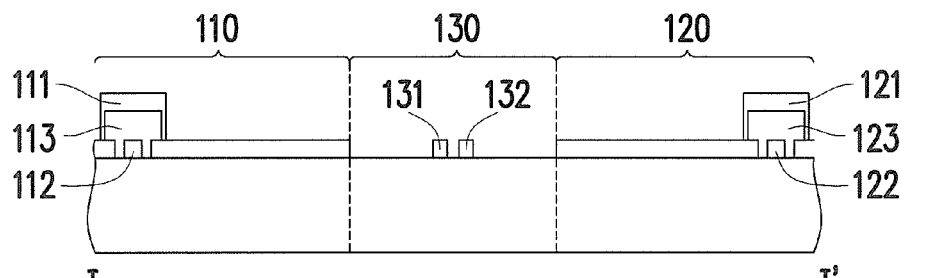
FIG. 6C is a cross-sectional schematic of the touch panel of FIG. 6A along line I-I'.

FIG. 6A is a schematic of a touch panel of another embodiment of the disclosure. FIG. 6B is an enlarged schematic of a portion of the touch panel of FIG. 6A. FIG. 6C is a cross-sectional schematic of the touch panel of FIG. 6A along line I-I'. Referring to FIG. 6A, FIG. 6B, and FIG. 6C, in the present embodiment, a touch panel 10e is similar to the touch panel 10d, and similar components thereof are labeled with the same reference numerals and have similar functions, and are therefore not repeated herein. The main difference between the touch panel 10e and the touch panel 10d is that the touch panel 10e further includes a plurality of second compensation sub-electrodes 131b and a plurality of fourth compensation sub-electrodes 132b, the second compensation sub-electrodes 131b are extended from the first compensation sub-electrodes 131a toward the direction of the first sub-electrode 111a and the first electrodes 111, and is between the adjacent first sub-electrode 111a and the first electrodes 111; and the fourth compensation sub-electrodes 132b are extended from the third compensation sub-electrodes 132a toward the direction of the third sub-electrode 121a and the third electrodes 121, and are between the adjacent third sub-electrode 121a and the third electrodes 121.

More specifically, in the present embodiment, in the touch panel 10e, each of the first electrodes 111 further contains a plurality of second sub-electrodes 111b in the first touch folding region 130, a portion of the second sub-electrodes 111b is extended from the first electrodes 111 toward the direction of the adjacent first compensation sub-electrodes 131a, and another portion of the second sub-electrodes 111b is extended from the first sub-electrodes 111a toward the direction of the adjacent first compensation sub-electrodes 131a; each of the third electrodes 121 further contains a plurality of fourth sub-electrodes 121b in the first touch folding region 130, a portion of the fourth sub-electrodes 121b is extended from the third electrodes 121 toward the direction of the adjacent third compensation sub-electrodes 132a, and another portion of the fourth sub-electrodes 121b is extended from the third sub-electrodes 121a toward the direction of the adjacent third compensation sub-electrodes 132a. For example, each of the second sub-electrodes 111b and each of the second compensation sub-electrodes 131b are staggered with one another, and each of the fourth sub-electrodes 121b and each of the fourth compensation sub-electrodes 132b are staggered with one another. As a result, the capacitance value of the mutual capacitance of the first electrodes 111, the third electrodes 121, the first compensation electrode 131, and the second compensation electrode 132 can be changed, such that the first electrodes 111, the third electrodes 121, the first compensation electrode 131, and the second compensation electrode 132 can have the effect of good capacitance matching, so that the object of good touch sensing is achieved.

In the touch panel 10e of the present embodiment, the first electrodes 111 and the second electrodes 112 intersected with one another and the third electrodes 121 and the fourth electrodes 122 intersected with one another are respectively disposed in the first touch region 110 and the second touch region 120 on the substrate 100. In other words, electrode structures intersected with one another are not disposed in the first touch folding region 130. Therefore, even if the touch panel 10e is used under repeated bending or folding, the electrode structures can be less readily damaged, such that the touch panel 10e has better durability. More specifically, the touch panel 10e further includes a plurality of second compensation sub-electrodes 131b, each of the first electrodes 111 further contains a plurality of second sub-electrodes 111b in the first touch folding region 130, and each of the third electrodes 121 further contains a plurality of fourth sub-electrodes 121b in the first touch folding region 130. For example, each of the second sub-electrodes 111b and each of the second compensation sub-electrodes 131b are staggered with one another, and each of the fourth sub-electrodes 121b and each of the second compensation sub-electrodes 131b are staggered with one another. In this way, by the staggered disposition of each of the second sub-electrodes 111b and each of the second compensation sub-electrodes 131b and the staggered disposition of each of the fourth sub-electrodes 121b and each of the second compensation sub-electrodes 131b in the first touch folding region 130 of the touch panel 10e, the effect of good touch sensing can be achieved, and the stability of touch sensing thereof can be increased.

Figure 7A:
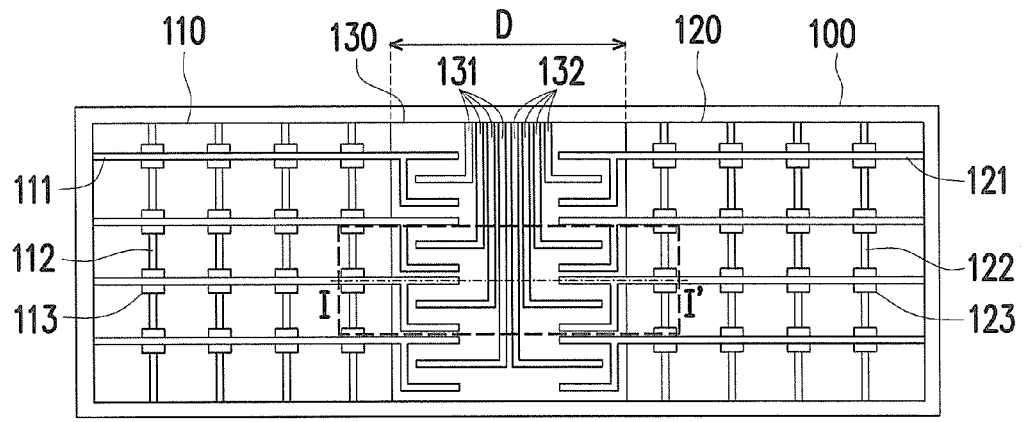
FIG. 7A is a schematic of a touch panel of yet another embodiment of the disclosure.
Figure 7B:
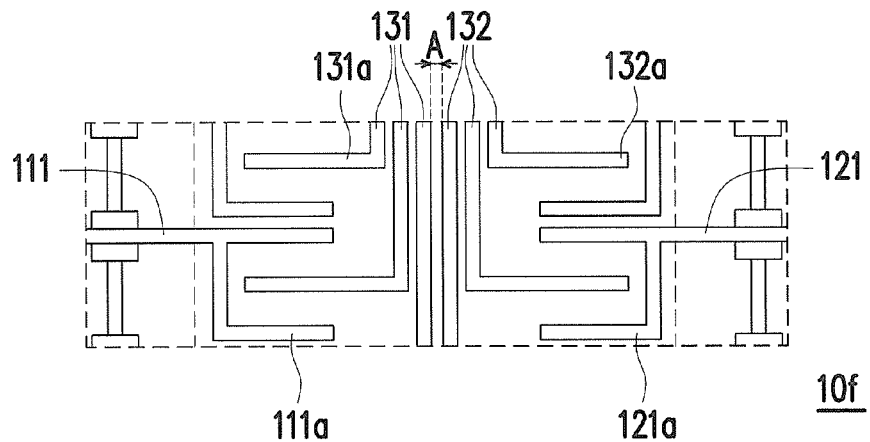
FIG. 7B is an enlarged schematic of a portion of the touch panel of FIG. 7A.
Figure 7C:
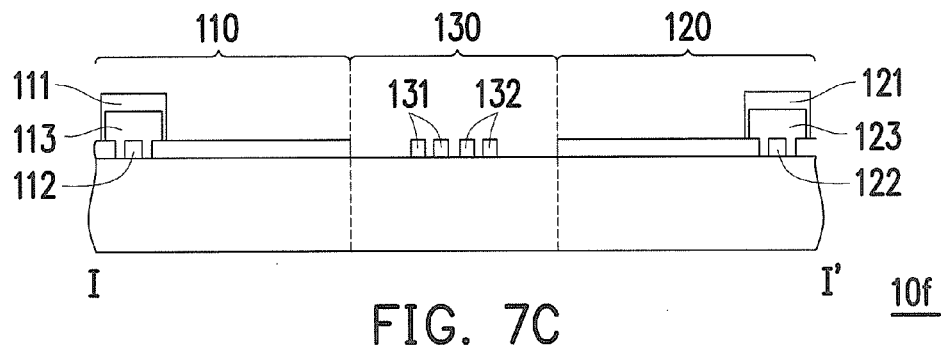
FIG. 7C is a cross-sectional schematic of the touch panel of FIG. 7A along line I-I'.

FIG. 7A is a schematic of a touch panel of yet another embodiment of the disclosure. FIG. 7B is an enlarged schematic of a portion of the touch panel of FIG. 7A. FIG. 7C is a cross-sectional schematic of the touch panel of FIG. 7A along line I-I'. Referring to FIG. 7A, FIG. 7B, and FIG. 7C, in the present embodiment, a touch panel 10f is similar to the touch panel 10d, and similar components thereof are labeled with the same reference numerals and have similar functions, and are therefore not repeated herein. The main difference between the touch panel 10f and the touch panel 10d is that the touch panel 10f includes a plurality of first compensation electrodes 131 and a plurality of second compensation electrodes 132, the first compensation electrodes 131 and the plurality of second compensation electrodes 132 are disposed in the first touch folding region 130 and are between the first electrodes 111 and the third electrodes 121, each of the first compensation electrodes 131 is electrically independent of one another, and each of the second compensation electrodes 132 is electrically independent of one another.

In the present embodiment, each of the first compensation electrodes 131 in the touch panel 10f further contains at least one first compensation sub-electrode 131a, the first compensation sub-electrode 131a is extended from the first compensation electrode 131 toward the direction of the first touch region 110, and is between the adjacent first electrodes 111; and each of the second compensation electrodes 132 further contains at least one third compensation sub-electrode 132a, the third compensation sub-electrode 132a is extended from the second compensation electrode 132 toward the direction of the second touch region 120, and is between the adjacent third electrodes 121. In other words, each of the first compensation sub-electrodes 131a and the first electrodes 111 are staggered with one another and each of the third compensation sub-electrodes 132a and the third electrodes 121 are staggered with one another. By the staggered disposition of the first compensation sub-electrodes 131a and the first electrodes 111 and the staggered disposition of the third compensation sub-electrodes 132a and the third electrodes 121, the capacitance value of the mutual capacitance of the first electrodes 111, the third electrodes 121, the first compensation sub-electrodes 131a, and the third compensation sub-electrodes 132a can be changed, such that the first electrodes 111, the third electrodes 121, the first compensation sub-electrodes 131a, and the third compensation sub-electrodes 132a can have the effect of good capacitance matching, so that the object of good touch sensing is achieved.

More specifically, in the present embodiment, each of the first electrodes 111 of the touch panel 10f further contains at least one first sub-electrode 111a in the first touch folding region 130, and each of the first compensation sub-electrodes 131a is between the first sub-electrode 111a and the first electrode 111. Moreover, each of the third electrodes 121 further contains at least one third sub-electrode 121a in the first touch folding region 130, and each of the third compensation sub-electrodes 132a is between the third sub-electrode 121a and the third electrodes 121. In other words, each of the first compensation sub-electrodes 131a is respectively staggered with the first electrodes 111 and the first sub-electrode 111a, and each of the third compensation sub-electrodes 132a is respectively staggered with the third electrodes 121 and the third sub-electrode 121a. Each of the first compensation sub-electrodes 131a is respectively staggered with the first electrodes 111 and the first sub-electrodes 111a, and each of the third compensation sub-electrodes 132a is respectively staggered with the third electrodes 121 and the third sub-electrodes 121a, the first electrodes 111, the third electrodes 121, the first compensation electrode 131, and the second compensation electrode 132 can have the effect of good capacitance matching, such that the object of good touch sensing is achieved.

In this way, in the touch panel 10f of the present embodiment, the first electrodes 111 and the second electrodes 112 intersected with one another and the third electrodes 121 and the fourth electrodes 122 intersected with one another are respectively disposed in the first touch region 110 and the second touch region 120 on the substrate 100. In other words, electrode structures intersected with one another are not disposed in the first touch folding region 130. Therefore, even if the touch panel 10f is used under repeated bending or folding, the electrode structures can be less readily damaged, such that the touch panel 10f has better durability. Moreover, since electrodes are not disposed in the distance A between the first compensation electrode 131 and the second compensation electrode 132, the electrode structures in the first touch folding region 130 may are less readily damaged when the touch panel 10f is used under repeated bending or folding, such that the touch panel 10f has better durability. Moreover, the first compensation electrode 131 further contains at least one first compensation sub-electrode 131a, the second compensation electrode 132 contains at least one third compensation sub-electrode 132a, the first compensation sub-electrode 131a and the first electrodes 111 are staggered with one another, and the third compensation sub-electrode 132a and the third electrodes 121 are staggered with one another. Accordingly, in the first touch folding region 130 of the touch panel 10f, by the staggered disposition of each of the first compensation sub-electrodes 131a and the first electrodes 111 and the staggered disposition of each of the third compensation sub-electrodes 132a and the third electrodes 121, the effect of good touch sensing can be achieved. More specifically, in the touch panel 10f, each of the first electrodes 111 further contains at least one first sub-electrode 111a in the first touch folding region 130, each of the third electrodes 121 further contains at least one third sub-electrode 121a in the first touch folding region 130, and each of the first compensation sub-electrodes 131a is respectively staggered with the first electrodes 111 and the first sub-electrode 111a, and each of the third compensation sub-electrodes 132a is respectively staggered with the third electrodes 121 and the third sub-electrode 121a. As a result, the touch panel 10f can further have the effect of good touch sensing, thus increasing the stability of touch sensing thereof.

Figure 8A:
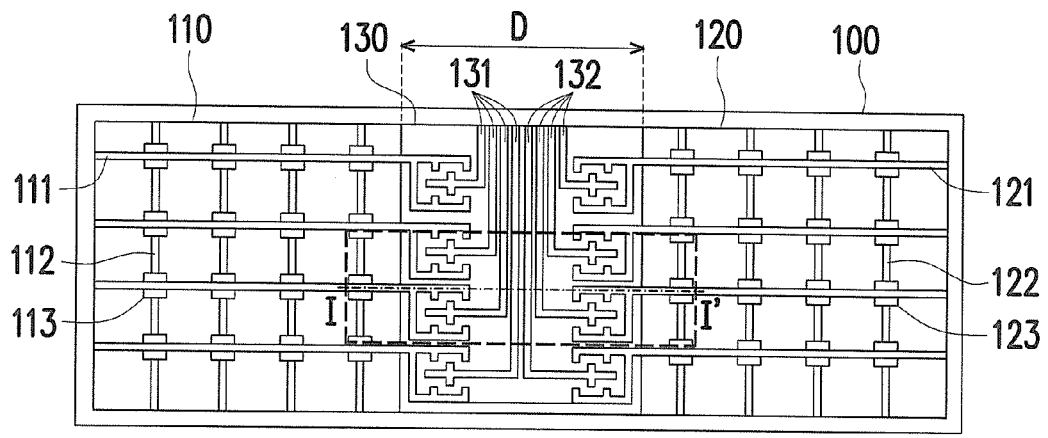
FIG. 8A is a schematic of a touch panel of still yet another embodiment of the disclosure.
Figure 8B:
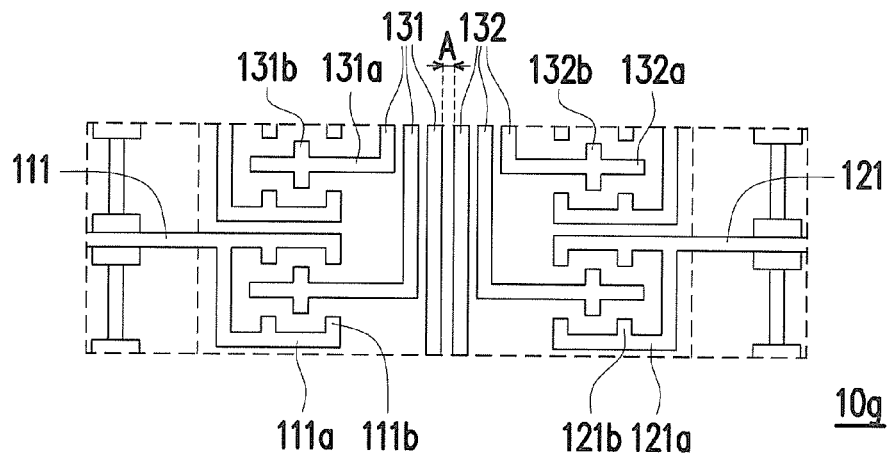
FIG. 8B is an enlarged schematic of a portion of the touch panel of FIG. 8A.
Figure 8C:
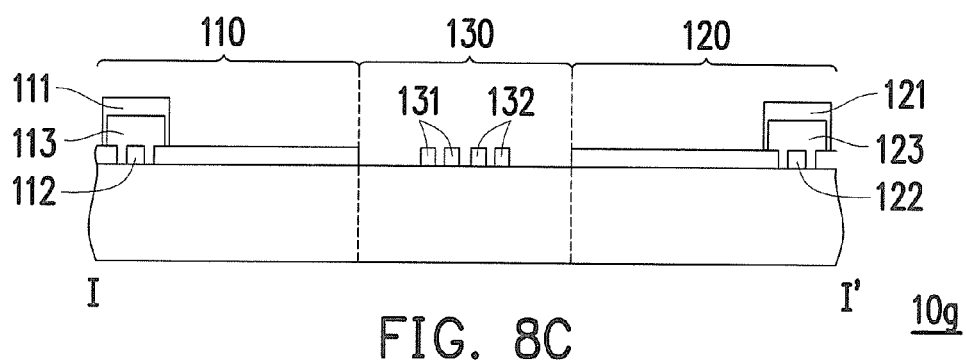
FIG. 8C is a cross-sectional schematic of the touch panel of FIG. 8A along line I-I'.

FIG. 8A is a schematic of a touch panel of still yet another embodiment of the disclosure. FIG. 8B is an enlarged schematic of a portion of the touch panel of FIG. 8A. FIG. 8C is a cross-sectional schematic of the touch panel of FIG. 8A along line I-I'. Referring to FIG. 8A, FIG. 8B, and FIG. 8C, in the present embodiment, a touch panel 10g is similar to the touch panel 10f, and similar components thereof are labeled with the same reference numerals and have similar functions, and are therefore not repeated herein. The main difference between the touch panel 10g and the touch panel 10f is that the touch panel 10g further includes a plurality of second compensation sub-electrodes 131b and a plurality of fourth compensation sub-electrodes 132b, the second compensation sub-electrodes 131b are extended from the first compensation sub-electrode 131a toward the direction of the first sub-electrode 111a and the first electrodes 111, and is between the adjacent first sub-electrode 111a and the first electrodes 111; and the fourth compensation sub-electrodes 132b are extended from the third compensation sub-electrode 132a toward the direction of the third sub-electrode 121a and the third electrodes 121, and are between the adjacent third sub-electrode 121a and the third electrodes 121.

More specifically, in the present embodiment, in the touch panel 10g, each of the first electrodes 111 further contains a plurality of second sub-electrodes 111b in the first touch folding region 130, a portion of the second sub-electrodes 111b is extended from the first electrodes 111 toward the direction of the adjacent first compensation sub-electrode 131a, another portion of the second sub-electrodes 111b is extended from the first sub-electrode 111a toward the direction of the adjacent first compensation sub-electrode 131a; each of the third electrodes 121 further contains a plurality of fourth sub-electrodes 121b in the first touch folding region 130, a portion of the fourth sub-electrodes 121b is extended from the third electrodes 121 toward the direction of the adjacent third compensation sub-electrode 132a, and another portion of the fourth sub-electrodes 121b is extended from the third sub-electrode 121a toward the direction of the adjacent third compensation sub-electrode 132a. For example, each of the second sub-electrodes 111b and each of the second compensation sub-electrodes 131b are staggered with one another, and each of the fourth sub-electrodes 121b and each of the fourth compensation sub-electrodes 132b are staggered with one another. As a result, the capacitance value of the mutual capacitance of the first electrodes 111, the third electrodes 121, the first compensation electrode 131, and the second compensation electrode 132 can be changed, such that the first electrodes 111, the third electrodes 121, the first compensation electrode 131, and the second compensation electrode 132 can have the effect of good capacitance matching, so that the object of good touch sensing is achieved.

In the touch panel 10g of the present embodiment, the first electrodes 111 and the second electrodes 112 intersected with one another and the third electrodes 121 and the fourth electrodes 122 intersected with one another are respectively disposed in the first touch region 110 and the second touch region 120 on the substrate 100. In other words, electrode structures intersected with one another are not disposed in the first touch folding region 130. Therefore, even if the touch panel 10g is used under repeated bending or folding, the electrode structures can be less readily damaged, such that the touch panel 10g has better durability. More specifically, the touch panel 10g further includes a plurality of second compensation sub-electrodes 131b, each of the first electrodes 111 further contains a plurality of second sub-electrodes 111b in the first touch folding region 130, and each of the third electrodes 121 further contains a plurality of fourth sub-electrodes 121b in the first touch folding region 130. Each of the second sub-electrodes 111b and each of the second compensation sub-electrodes 131b are staggered with one another, and each of the fourth sub-electrodes 121b and each of the fourth compensation sub-electrodes 132b are staggered with one another. In this way, by the staggered disposition of each of the second sub-electrodes 111b and each of the second compensation sub-electrodes 131b, and the staggered disposition of each of the fourth sub-electrodes 121b and each of the fourth compensation sub-electrodes 132b in the first touch folding region 130 of the touch panel 10g, the effect of good touch sensing can be achieved, and the stability of touch sensing thereof can be increased.

Figure 9:
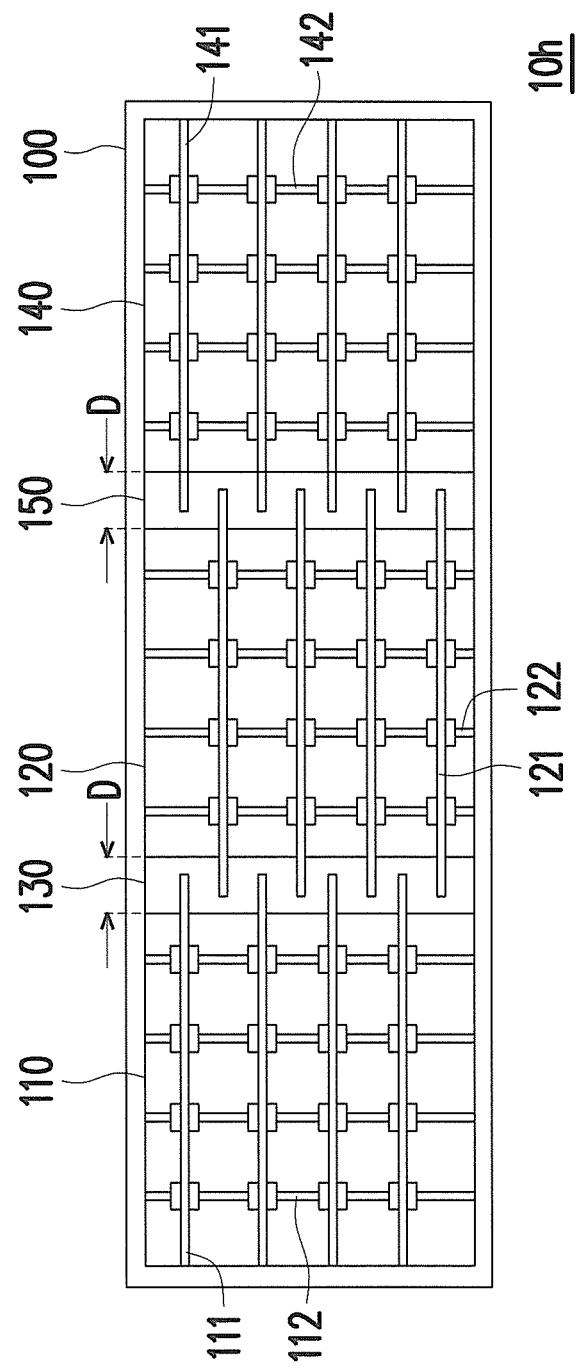
FIG. 9 to FIG. 12 are schematics of the disposition of touch regions of a touch panel of the disclosure.

FIG. 9 to FIG. 12 are schematics of the disposition of touch regions of a touch panel of the disclosure. Referring first to FIG. 9, in the present embodiment, a touch panel 10h is similar to any one of the touch panels 10a to 10g, and similar components thereof are labeled with the same reference numerals and have similar functions, and are therefore not repeated herein. For ease of description, the electrode disposition of the touch panel 10a is used along with figures, but the disclosure is not limited thereto. The main difference between the touch panel 10h and the touch panel 10a is that the touch panel 10h further includes a third touch region 140 and a second touch folding region 150, and the second touch folding region 150 is disposed between the second touch region 120 and the third touch region 140. A plurality of fifth electrodes 141 and a plurality of sixth electrodes 142 are disposed in the third touch region 140 on the substrate 100, the fifth electrodes 141 and the sixth electrodes 142 are intersected with one another, the fifth electrodes 141 are extended from the third touch region 140 to the second touch folding region 150, the third electrodes 121 are extended from the second touch region 120 to the second touch folding region 150, the third electrodes 121 and the fifth electrodes 141 are not intersected with one another, and the ratio of any side length of the touch panel 10h to the distance D between the second touch region 120 and the third touch region 140 is between 9.5 and 95.

In this way, in the touch panel 10h of the present embodiment, electrode structures intersected with one another are not disposed in the first touch folding region 130 and the second touch folding region 150. As a result, even if the touch panel 10h is used under repeated bending or folding, the electrode structures can be less readily damaged, such that the touch panel 10h has better durability. Moreover, by the disposition of a plurality of touch folding regions, the convenience of use of the touch panel can be effectively improved.

Figure 10:
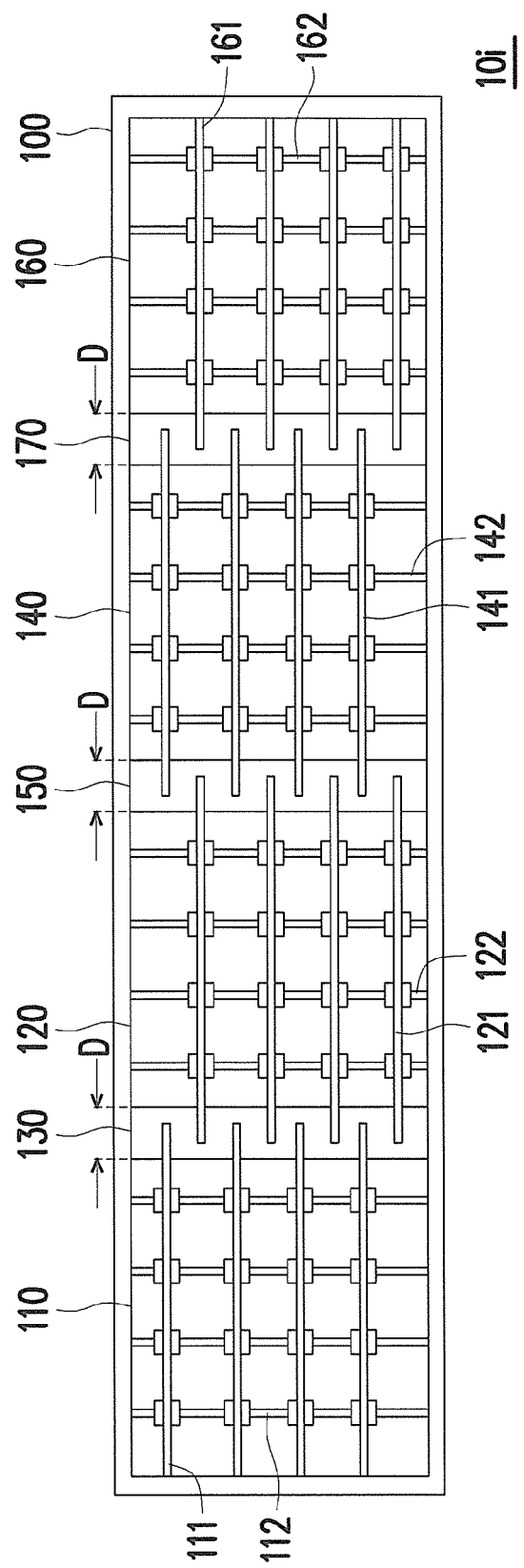

Then, referring to FIG. 10, in the present embodiment, a touch panel 10i is similar to the touch panel 10h, and similar components thereof are labeled with the same reference numerals and have similar functions, and are therefore not repeated herein. The main difference between the touch panel 10i and the touch panel 10h is that the touch panel 10i further includes a fourth touch region 160 and a third touch folding region 170, and the third touch folding region 170 is disposed between the third touch region 140 and the fourth touch region 160. A plurality of seventh electrodes 161 and a plurality of eighth electrodes 162 are disposed in the fourth touch region 160 on the substrate 100, the seventh electrodes 161 and the eighth electrodes 162 are intersected with one another, the seventh electrodes 161 are extended from the fourth touch region 160 to the third touch folding region 170, the fifth electrodes 141 are extended from the third touch region 140 to the third touch folding region 170, the fifth electrodes 141 and the seventh electrodes 161 are not intersected with one another, and the ratio of any side length of the touch panel 10i to the distance D between the third touch region 140 and the fourth touch region 160 is between 9.5 and 95.

In this way, in the touch panel 10i of the present embodiment, electrode structures intersected with one another are not disposed in the first touch folding region 130, the second touch folding region 150, and the third touch folding region 170. As a result, even if the touch panel 10*i* is used under repeated bending or folding, the electrode structures can be less readily damaged, such that the touch panel 10*i* has better durability. Moreover, by the disposition of a plurality of touch folding regions, the convenience of use of the touch panel can be effectively improved.

Figure 11:
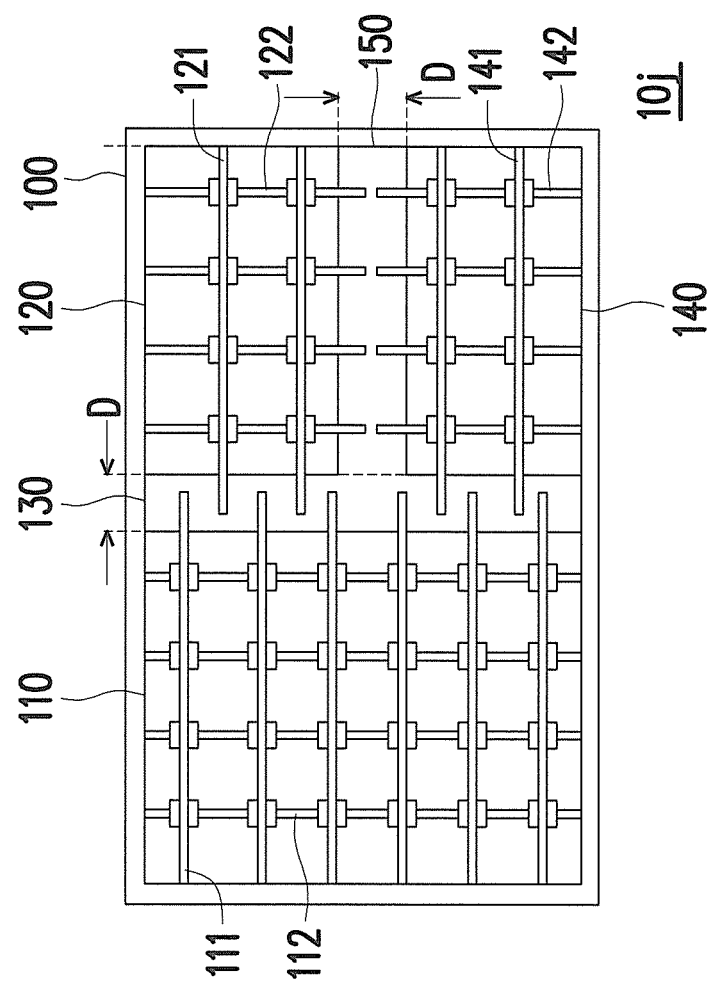

Referring to FIG. 11, in the present embodiment, a touch panel 10*j* is similar to the touch panel 10*a*, and similar components thereof are labeled with the same reference numerals and have similar functions, and are therefore not repeated herein. The main difference between the touch panel 10*j* and the touch panel 10*a* is that the touch panel 10*j* further includes a third touch region 140 and a second touch folding region 150, the second touch folding region 150 and the first touch folding region 130 are intersected with one another, and the second touch folding region 150 is disposed between the second touch region 120 and the third touch region 140. A plurality of fifth electrodes 141 and a plurality of sixth electrodes 142 are disposed in the third touch region 140 on the substrate 100, the fifth electrodes 141 and the sixth electrodes 142 are intersected with one another, the fifth electrodes 141 are extended from the third touch region 140 to the first touch folding region 130, the sixth electrodes 142 are extended from the third touch region 140 to the second touch folding region 150, the fourth electrodes 122 are extended from the second touch region 120 to the second touch folding region 150, the fourth electrodes 122 and the sixth electrodes 142 are not intersected with one another, the first electrodes 111 and the fifth electrodes 141 are not intersected with one another, and the ratio of any side length of the touch panel 10*j* to the distance D between the second touch region 120 and the third touch region 140 is between 9.5 and 95.

In this way, in the touch panel 10*j* of the present embodiment, electrode structures intersected with one another are not disposed in the first touch folding region 130 and the second touch folding region 150. As a result, even if the touch panel 10*j* is used under repeated bending or folding, the electrode structures can be less readily damaged, such that the touch panel 10*j* has better durability. Moreover, by the disposition of a plurality of touch folding regions, the convenience of use of the touch panel can be effectively improved.

Figure 12:
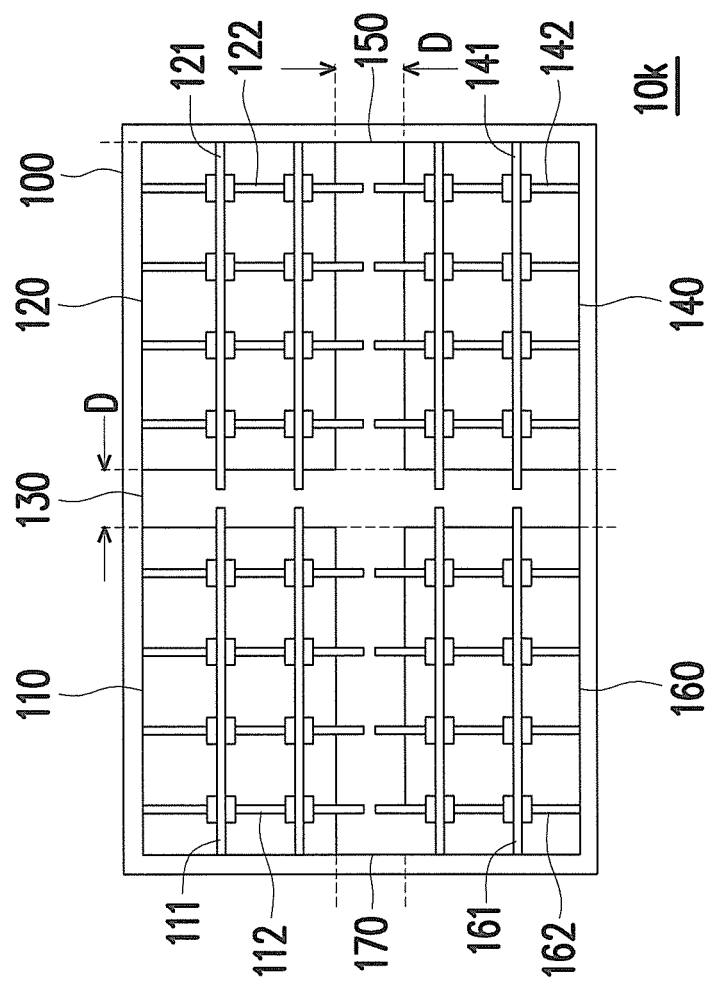

Referring to FIG. 12, in the present embodiment, a touch panel 10*k* is similar to the touch panel 10*j*, and similar components thereof are labeled with the same reference numerals and have similar functions, and are therefore not repeated herein. The main difference between the touch panel 10*k* and the touch panel 10*j* is that the touch panel 10*k* further includes a fourth touch region 160 and a third touch folding region 170, the third touch folding region 170 and the first touch folding region 130 are intersected with one another, and the third touch folding region 170 is disposed between the first touch region 110 and the fourth touch region 160. A plurality of seventh electrodes 161 and a plurality of eighth electrodes 162 are disposed in the fourth touch region 160 on the substrate 100, the seventh electrodes 161 and the eighth electrodes 162 are intersected with one another, the seventh electrodes 161 are extended from the fourth touch region 160 to the first touch folding region 130, the eighth electrodes 162 are extended from the fourth touch region 160 to the third touch folding region 170, the second electrodes 112 are extended from the first touch region 110 to the third touch folding region 170, the second electrodes 112 and the eighth electrodes 162 are not intersected with one another, the fifth electrodes 141 and the seventh electrodes 161 are not intersected with one another, and the ratio of any side length of the touch panel 10*k* to the distance D between the first touch region 110 and the fourth touch region 160 is between 9.5 and 95.

In this way, in the touch panel 10*k* of the present embodiment, electrode structures intersected with one another are not disposed in the first touch folding region 130, the second touch folding region 150, and the third touch folding region 170. As a result, even if the touch panel 10*k* is used under repeated bending or folding, the electrode structures can be less readily damaged, such that the touch panel 10*k* has better durability. Moreover, by the disposition of a plurality of touch folding regions, the convenience of use of the touch panel can be effectively improved.

Figure 13A:
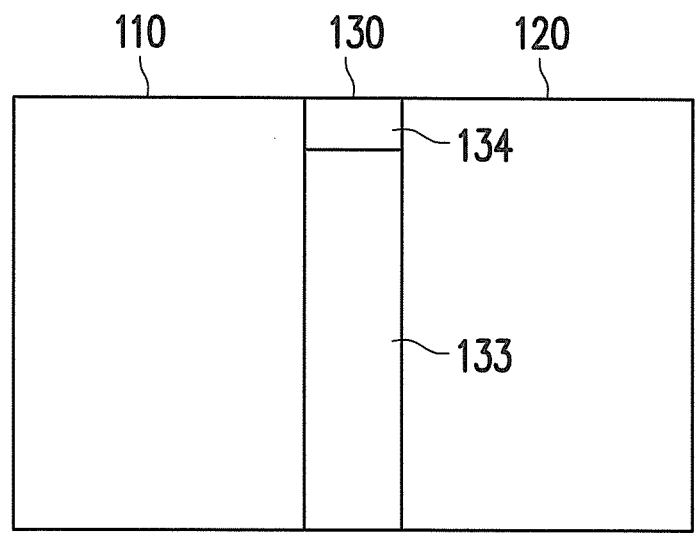
FIG. 13A to FIG. 13D are schematics of the disposition of a touch folding region of a touch panel of the disclosure.
Figure 13B:
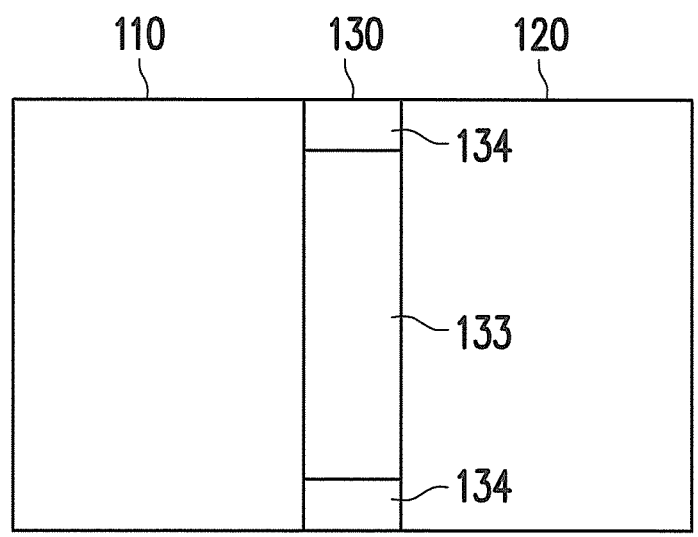
Figure 13C:
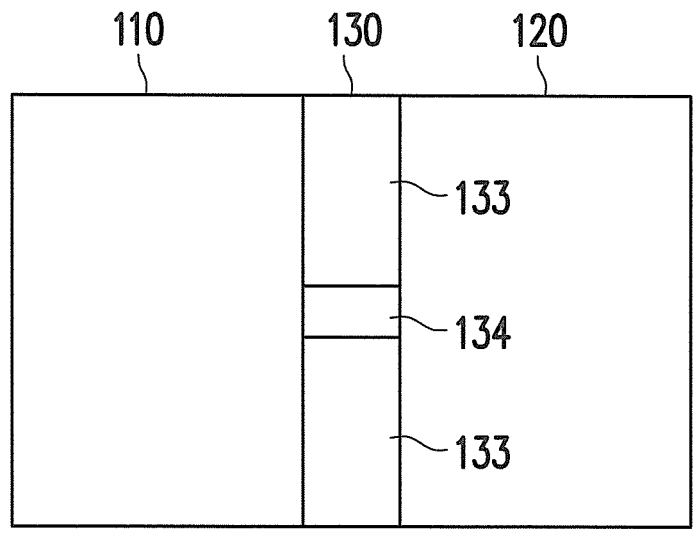
Figure 13D:
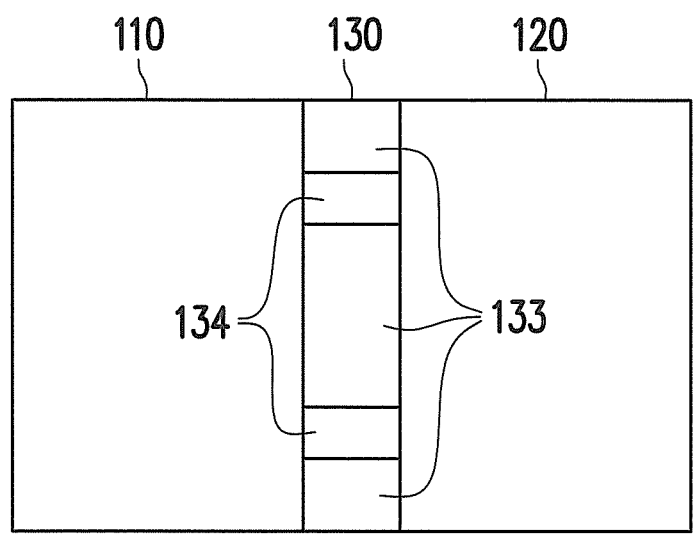

In addition to the above, the first touch folding region 130 of the touch panel of the disclosure can be divided into an electrical connection region 133 and a non-electrical connection region 134. Specifically, FIG. 13A to FIG. 13D are schematics of the disposition of a touch folding region of a touch panel of the disclosure. Referring to FIG. 13A, in the present embodiment, the first touch folding region 130 includes one electrical connection region 133 and one non-electrical connection region 134, and the non-electrical connection region 134 is located in one of the edge regions of the first touch folding region 130. Referring to FIG. 13B, in the present embodiment, the first touch folding region 130 includes one electrical connection region 133 and two non-electrical connection regions 134, and the two non-electrical connection regions 134 are respectively located in two edge regions of the first touch folding region 130. Referring to FIG. 13C, in the present embodiment, the first touch folding region 130 includes two electrical connection regions 133 and one non-electrical connection region 134, and the two electrical connection regions 133 are respectively located in two edge regions of the first touch folding region 130. Referring to FIG. 13D, in the present embodiment, the first touch folding region 130 includes three electrical connection regions 133 and two non-electrical connection regions 134, each of the electrical connection regions 133 and each of the non-electrical connection regions 134 are respectively alternately disposed, and two of the electrical connection regions 133 are located in two edge regions of the first touch folding region 130.

Figure 14A:
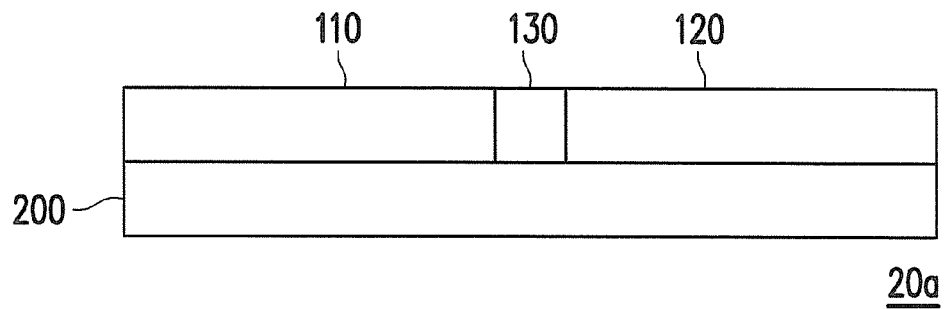
FIG. 14A to FIG. 14I are possible cross-sectional schematics of a touch display device of the disclosure.
Figure 14B:
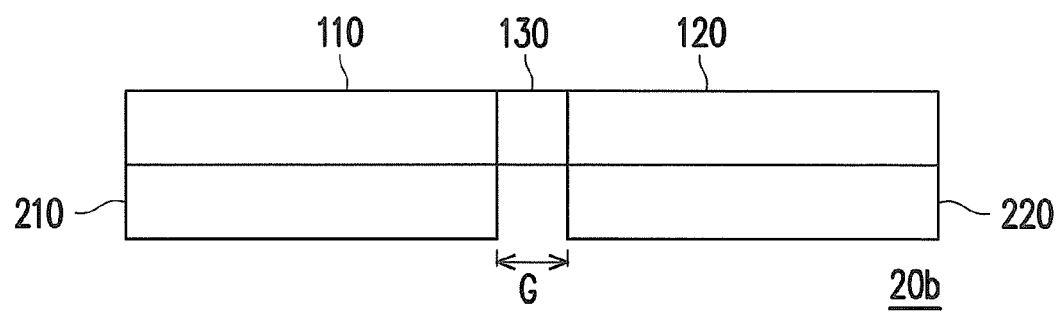
Figure 14C:
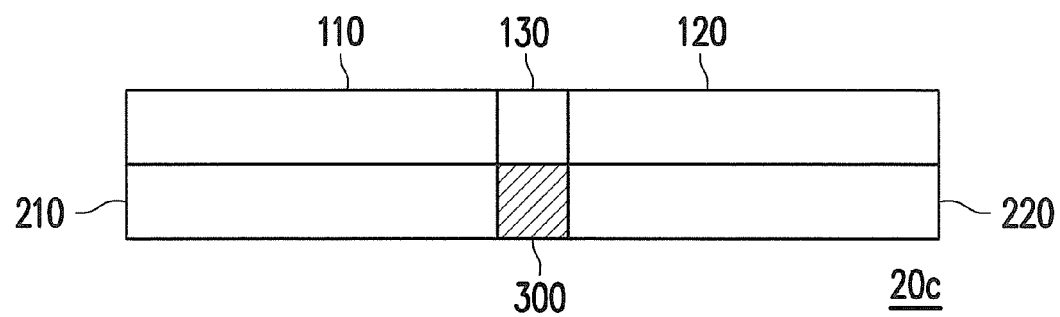
Figure 14D:
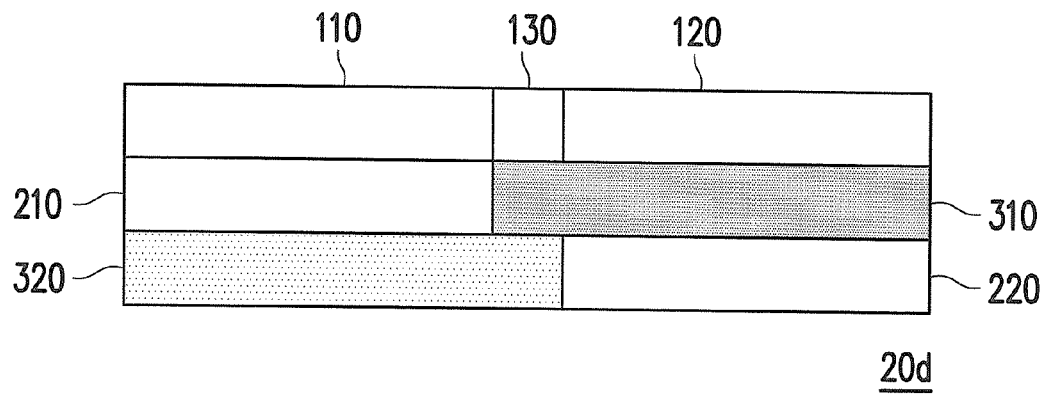
Figure 14E:
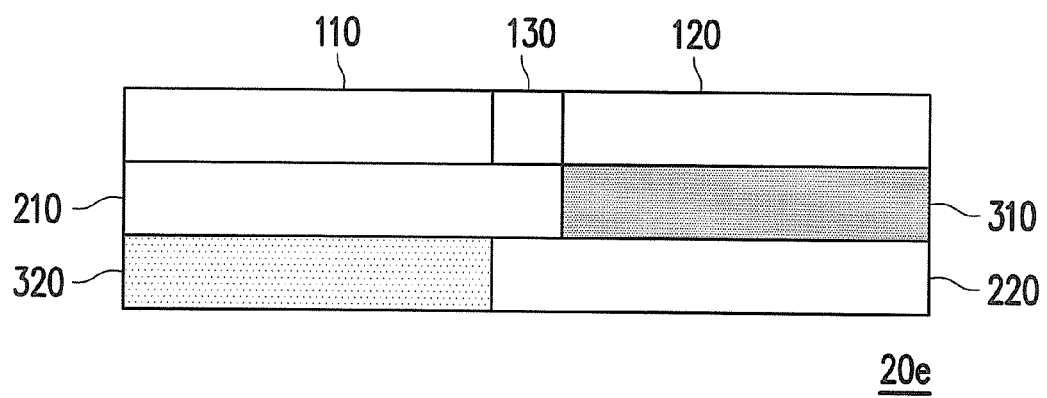
Figure 14F:
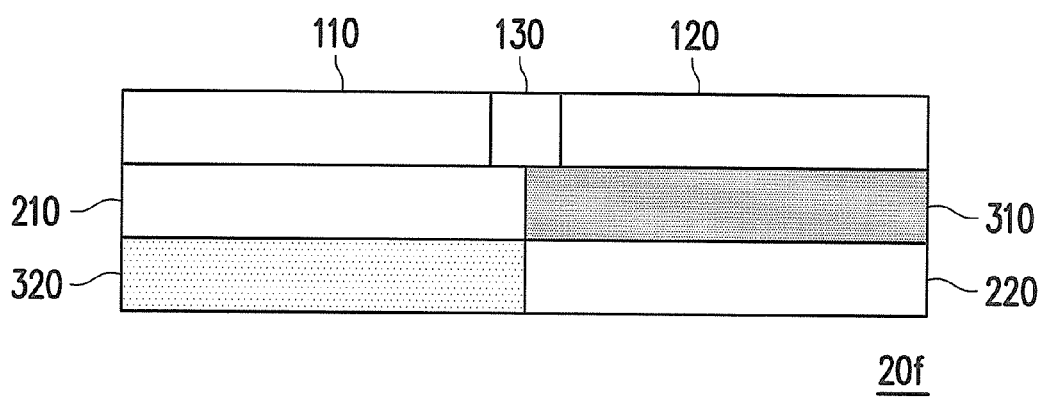
Figure 14G:
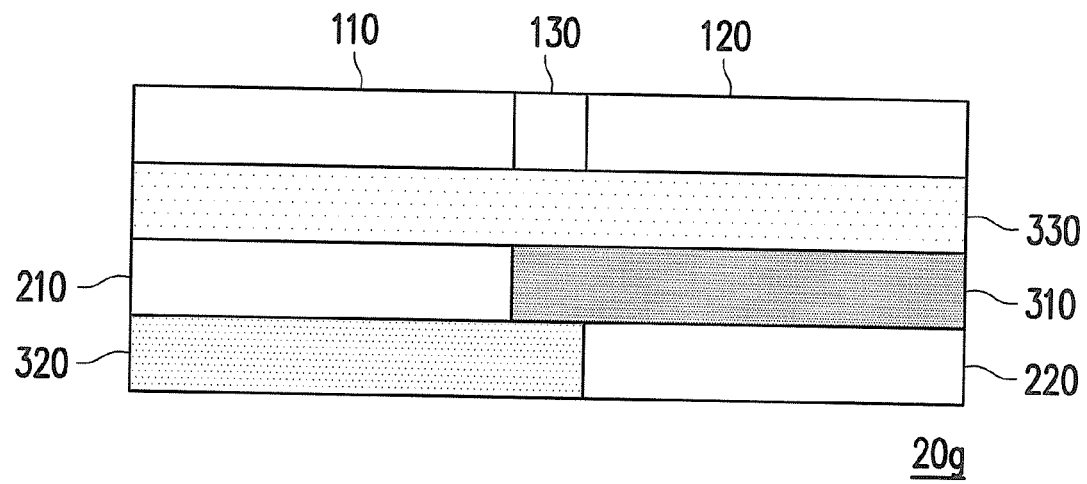
Figure 14H:
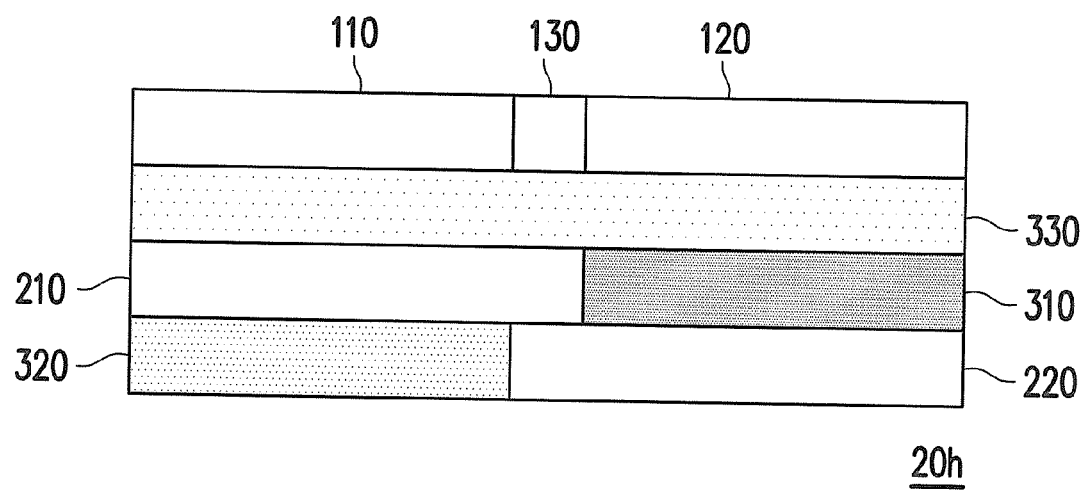
Figure 14I:
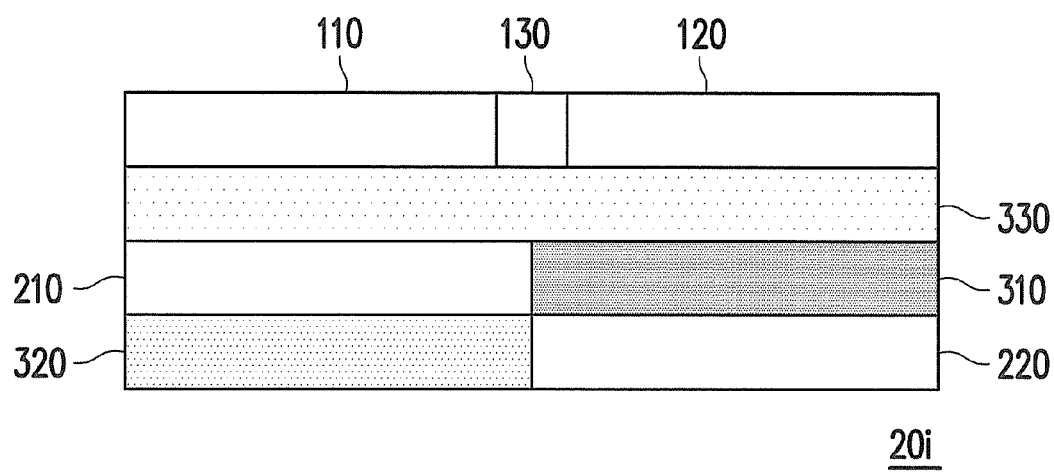

Moreover, the touch panel of the disclosure can further be used with a display panel to form a touch display device. For ease of description, the touch panel of FIG. 1A is described with a display panel as example in the following. FIG. 14A to FIG. 14I are possible cross-sectional schematics of a touch display device of the disclosure. Referring first to FIG. 14A, in the present embodiment, the first touch region 110, the second touch region 120, and the first touch folding region 130 are stacked corresponding to display panel 200. As a result, a touch display device 20*a* can be formed. Referring to FIG. 14B, in the present embodiment, the display panel can be divided into a first display panel 210 and a second display panel 220. The first display panel 210 is stacked corresponding to the first touch region 110, and the second display panel 220 is stacked corresponding to the second touch region 120. It should be mentioned that, a spacing G is between the first display panel 210 and the second display panel 220, and the spacing G substantially corresponds to the first touch folding region 130. As a result, a touch display device 20*b* can be formed. Referring to FIG. 14C, in the present embodiment, a touch display device 20*c* is similar to the touch display device 20*b*, and similar components thereof are labeled with the same reference numerals and have similar functions, and are therefore not repeated herein. The main difference between the touch display device 20*c* and the touch display device 20*b* is that, in the touch display device 20*c*, an insulation device 300 is further disposed between the first display panel 210 and the second display panel 220, the insulation device 300 is stacked corresponding to the first touch folding region 130, the insulation device 300 is connected to the first display panel 210 and the second display panel 220, and the insulation device 300 can be used to support the first display panel 210 and the second display panel 220. Referring to FIG. 14D, in the present embodiment, a touch display device 20d is similar to the touch display device 20b, and similar components thereof are labeled with the same reference numerals and have similar functions, and are therefore not repeated herein. The main difference between the touch display device 20d and the touch display device 20b is that the insulation device of the touch display device 20d can be divided into a first insulation device 310 and a second insulation device 320, the first display panel 210 is stacked corresponding to the first touch region 110, the first insulation device 310 is stacked corresponding to the first touch folding region 130 and the second touch region 120, and the first display panel 210 and the first insulation device 310 are connected to each other. Moreover, the second display panel 220 is stacked corresponding to the second touch region 120, the second insulation device 320 is stacked corresponding to the first touch folding region 130 and the first touch region 110, and the second display panel 220 and the second insulation device 320 are connected to each other. The first display panel 210 is disposed between the first touch region 110 and the second insulation device 320, the first insulation device 310 is disposed between the second insulation device 320 and the first touch folding region 130, and the first insulation device 310 is disposed between the second touch region 120 and the second display panel 220. Referring to FIG. 14E, in the present embodiment, a touch display device 20e is similar to the touch display device 20d, and similar components thereof are labeled with the same reference numerals and have similar functions, and are therefore not repeated herein. The main difference between the touch display device 20e and the touch display device 20d is that the first display panel 210 of the touch display device 20e is stacked corresponding to the first touch region 110 and the first touch folding region 130, the first insulation device 310 is stacked corresponding to the second touch region 120, and the first display panel 210 and the first insulation device 310 are connected to each other. Moreover, the second display panel 220 is stacked corresponding to the second touch region 120 and the first touch folding region 130, the second insulation device 320 is stacked corresponding to the first touch region 110, the second display panel 220 and the second insulation device 320 are connected to each other, the first display panel 210 is disposed between the first touch region 110 and the second insulation device 320, the first display panel 210 is disposed between the first touch folding region 130 and the second display panel 220, and the first insulation device 310 is disposed between the second touch region 120 and the second display panel 220. Referring to FIG. 14F, in the present embodiment, a touch display device 20f is similar to the touch display device 20d, and similar components thereof are labeled with the same reference numerals and have similar functions, and are therefore not repeated herein. The main difference between the touch display device 20f and the touch display device 20d is that the first display panel 210 of the touch display device 20f is stacked corresponding to the first touch region 110 and a portion of the first touch folding region 130, the first insulation device 310 is stacked corresponding to the second touch region 120 and another portion of the first touch folding region 130, and the first display panel 210 and the first insulation device 310 are connected to each other. Moreover, the second display panel 220 is stacked corresponding to the second touch region 120 and a portion of the first touch folding region 130, the second insulation device 320 is stacked corresponding to the first touch region 110 and another portion of the first touch folding region 130, the second display panel 220 and the second insulation device 320 are connected to each other, the first display panel 210 is disposed between the first touch region 110 and the second insulation device 320, the first display panel 210 is disposed between a portion of the first touch folding region 130 and the second insulation device 320, the first insulation device 310 is disposed between the second touch region 120 and the second display panel 220, and the first insulation device 310 is disposed between another portion of the first touch folding region 130 and the second display panel 220. Referring to FIG. 14G, in the present embodiment, a touch display device 20g is similar to the touch display device 20d, and similar components thereof are labeled with the same reference numerals and have similar functions, and are therefore not repeated herein. The main difference between the touch display device 20g and the touch display device 20d is that the touch display device 20g further includes a third insulation device 330, the third insulation device 330 is stacked corresponding to the first touch region 110, the first touch folding region 130, and the second touch region 120, the third insulation device 330 is stacked between the first touch region 110 and the first display panel 210, the third insulation device 330 is stacked between the first touch folding region 130 and the first insulation device 310, and the third insulation device 330 is stacked between the second touch region 120 and the first insulation device 310. Referring to FIG. 14H, in the present embodiment, a touch display device 20h is similar to the touch display device 20e, and similar components thereof are labeled with the same reference numerals and have similar functions, and are therefore not repeated herein. The main difference between the touch display device 20h and the touch display device 20e is that the touch display device 20h further includes a third insulation device 330, the third insulation device 330 is stacked corresponding to the first touch region 110, the first touch folding region 130, and the second touch region 120, the third insulation device 330 is stacked between the first touch region 110 and the first display panel 210, the third insulation device 330 is stacked between the first touch folding region 130 and the first display panel 210, and the third insulation device 330 is stacked between the second touch region 120 and the first insulation device 310. Referring to FIG. 14I, in the present embodiment, a touch display device 20i is similar to the touch display device 20f, and similar components thereof are labeled with the same reference numerals and have similar functions, and are therefore not repeated herein. The main difference between the touch display device 20i and the touch display device 20f is that the touch display device 20i further includes a third insulation device 330, the third insulation device 330 is stacked corresponding to the first touch region 110, the first touch folding region 130, and the second touch region 120, the third insulation device 330 is stacked between the first touch region 110 and the first display panel 210, the third insulation device 330 is stacked between a portion of the first touch folding region 130 and the first display panel 210, the third insulation device 330 is stacked between another portion of the first touch folding region 130 and the first insulation device 310, and the third insulation device 330 is stacked between the second touch region 120 and the first insulation device 310.

Figure 15A:
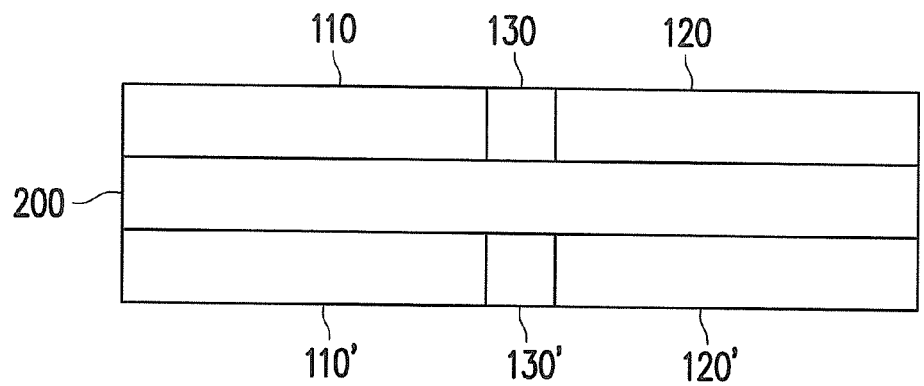
FIG. 15A to FIG. 15L are possible cross-sectional schematics of a double-sided touch display device of the disclosure.
Figure 15B:
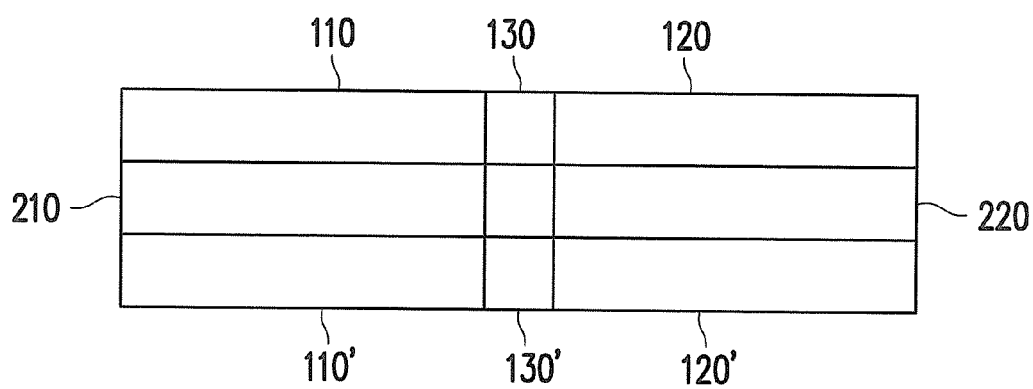
Figure 15C:
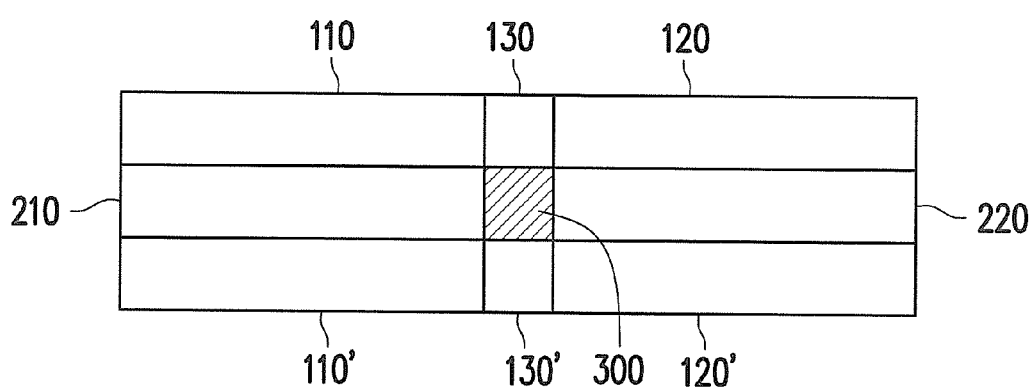
Figure 15D:
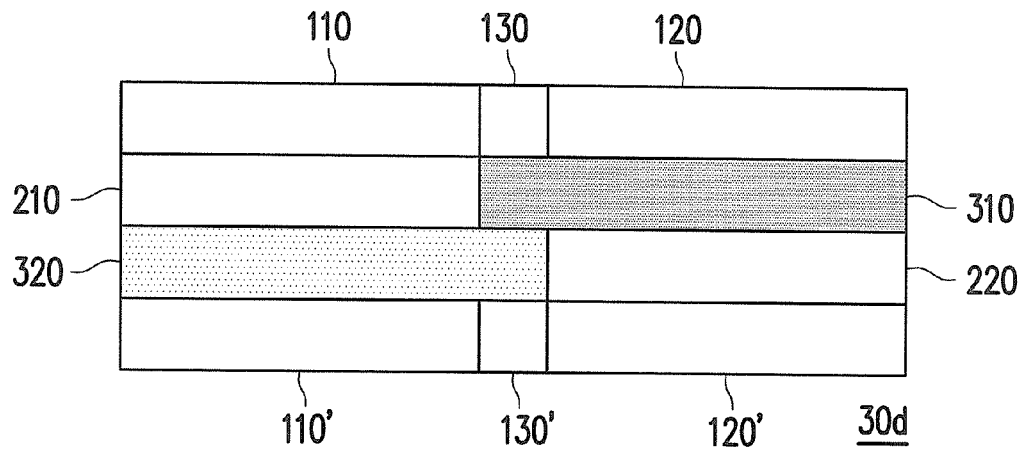
Figure 15E:
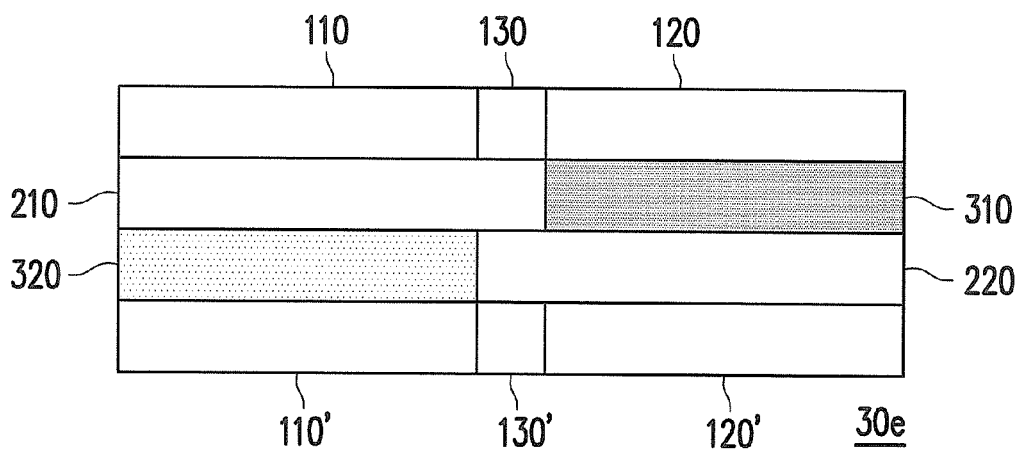
Figure 15F:
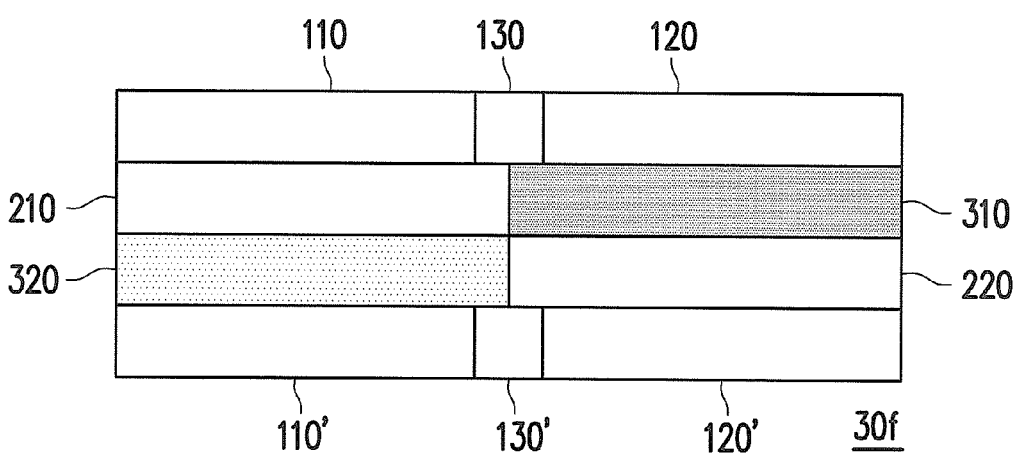
Figure 15G:
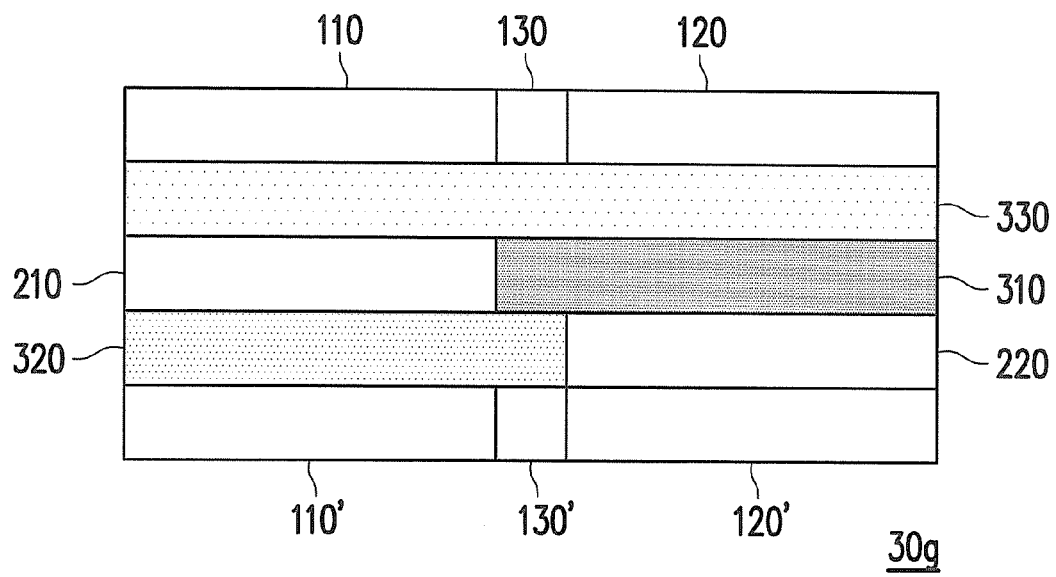
Figure 15H:
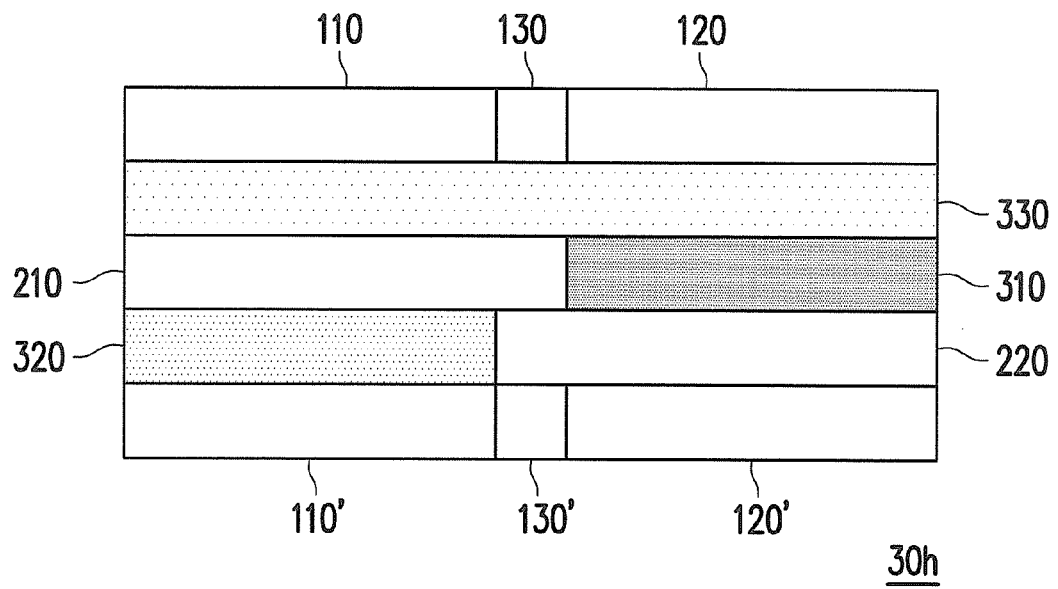
Figure 15I:
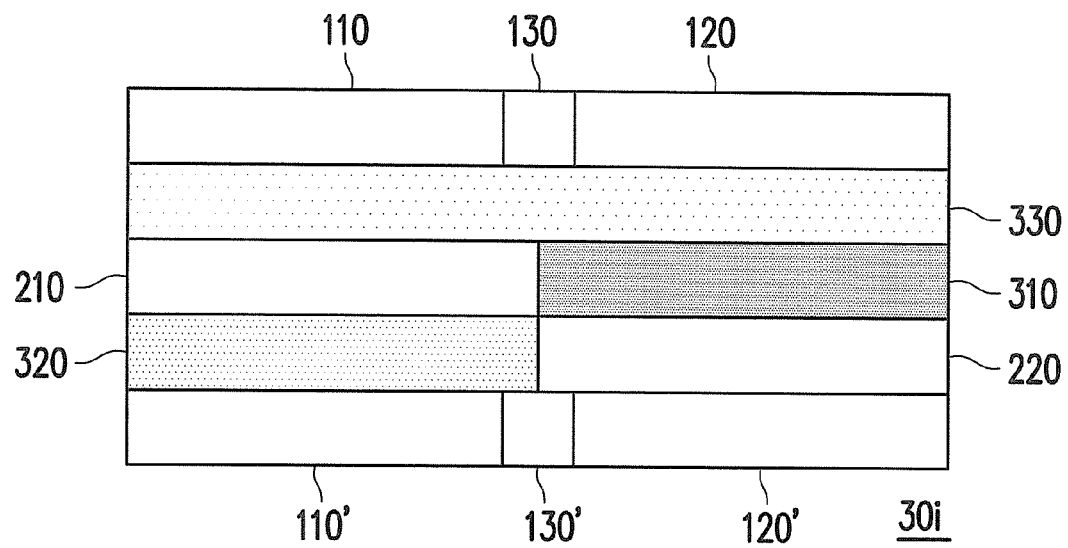
Figure 15J:
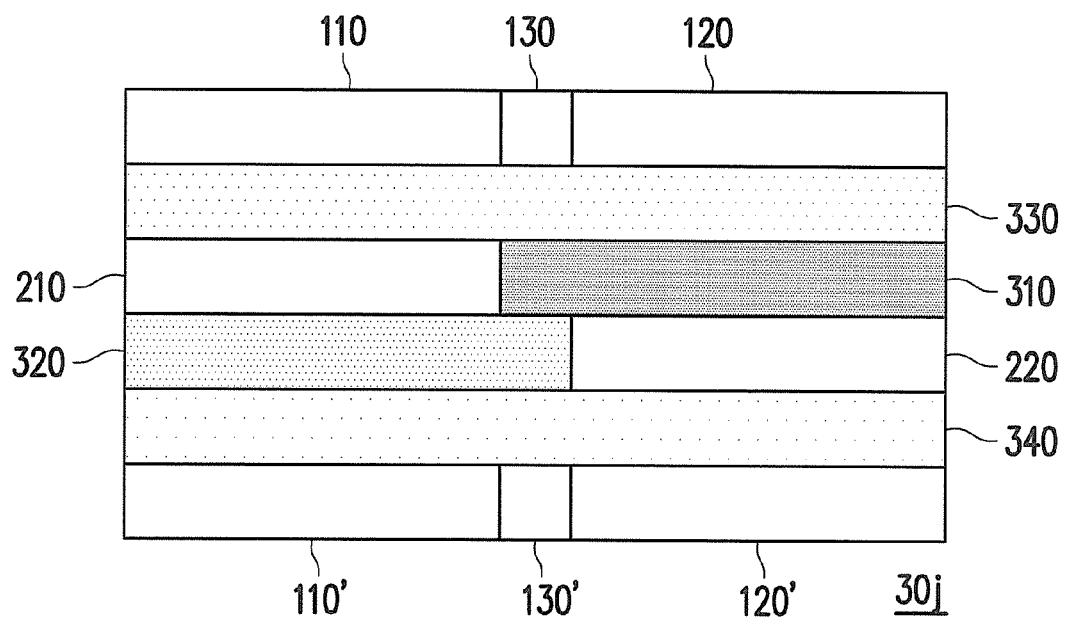
Figure 15K:
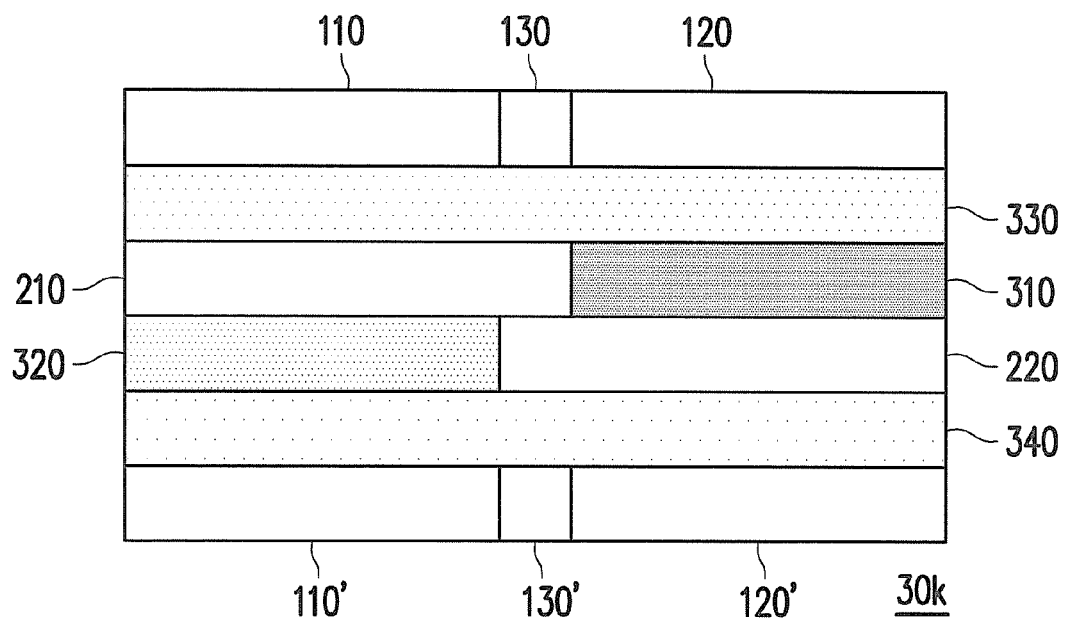
Figure 15L:
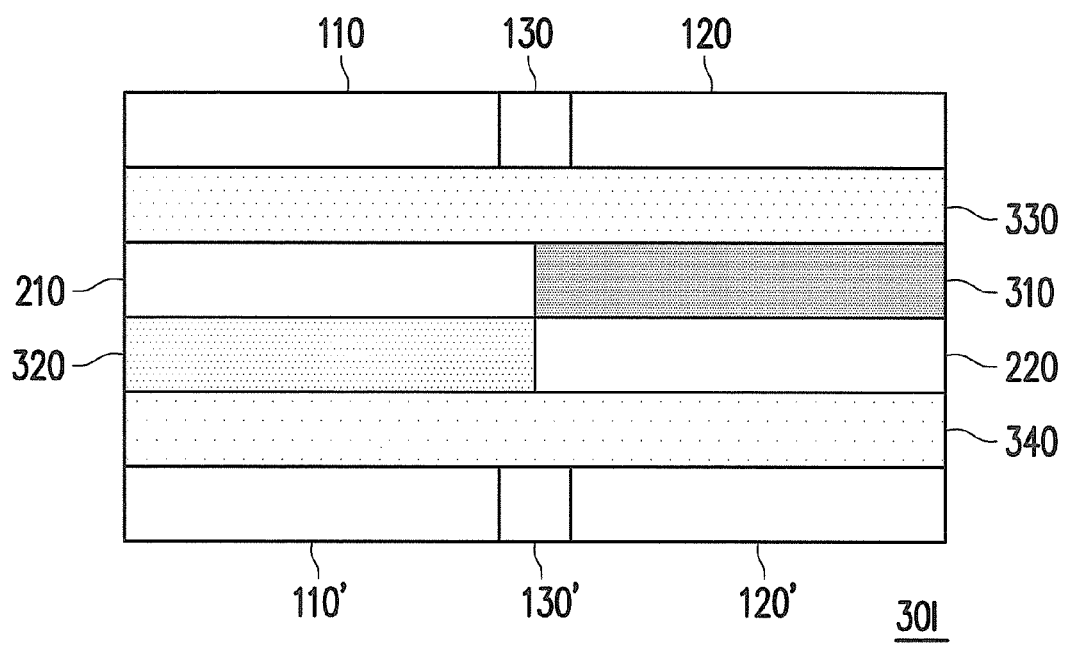

More specifically, the touch panel of the disclosure can further be used with a display panel of double-sided display to form a double-sided touch display device. FIG. 15A to FIG. 15L are possible cross-sectional schematics of a double-sided touch display device of the disclosure. FIG. 15A to FIG. 15I are respectively similar to FIG. 14A to FIG. 14I, and similar components thereof are labeled with the same reference numerals and have similar functions, and are therefore not repeated herein. The main difference respectively between double-sided touch display devices 30a to 30i in FIG. 15A to FIG. 15I and the touch display devices 20a to 20i in FIG. 14A to FIG. 14I is that the double-sided touch display devices 30a to 30i further include another group of touch panels, the other group of touch panels can be divided into a first touch region 110', a second touch region 120', and a first touch folding region 130', the first touch region 110 and the first touch region 110' are disposed corresponding to each other, the second touch region 120 and the second touch region 120' are disposed corresponding to each other, the first touch folding region 130 and the first touch folding region 130' are disposed corresponding to each other, and two groups of touch panels are respectively disposed on two opposite sides of the display panel. Moreover, referring to FIG. 15J, in the present embodiment, a double-sided touch display device 30j is similar to the double-sided touch display device 30g, and similar components thereof are labeled with the same reference numerals and have similar functions, and are therefore not repeated herein. The difference between the double-sided touch display device 30j and the double-sided touch display device 30g is that the double-sided touch display device 30j further includes a fourth insulation device 340, the fourth insulation device 340 is stacked corresponding to the first touch region 110', the first touch folding region 130', and the second touch region 120', the fourth insulation device 340 is stacked between the first touch region 110' and the second insulation device 320, the fourth insulation device 340 is stacked between the first touch folding region 130' and the second insulation device 320, and the fourth insulation device 340 is stacked between the second touch region 120' and the second display panel 220. Referring to FIG. 15K, in the present embodiment, a double-sided touch display device 30k is similar to the double-sided touch display device 30h, and similar components thereof are labeled with the same reference numerals and have similar functions, and are therefore not repeated herein. The main difference between the double-sided touch display device 30k and the double-sided touch display device 30h is that the double-sided touch display device 30k further includes a fourth insulation device 340, the fourth insulation device 340 is stacked corresponding to the first touch region 110', the first touch folding region 130', and the second touch region 120', the fourth insulation device 340 is stacked between the first touch region 110' and the second insulation device 320, the fourth insulation device 340 is stacked between the first touch folding region 130' and the second display panel 220, and the fourth insulation device 340 is stacked between the second touch region 120' and the second display panel 220. Referring to FIG. 15L, in the present embodiment, a double-sided touch display device 301 is similar to the double-sided touch display device 30i, and similar components thereof are labeled with the same reference numerals and have similar functions, and are therefore not repeated herein. The main difference between the double-sided touch display device 301 and the double-sided touch display device 30i is that the touch display device 301 further includes a fourth insulation device 340, the fourth insulation device 340 is stacked corresponding to the first touch region 110', the first touch folding region 130', and the second touch region 120', the fourth insulation device 340 is stacked between the first touch region 110' and the second insulation device 320, the fourth insulation device 340 is stacked between a portion of the first touch folding region 130' and the second insulation device 320, the fourth insulation device 340 is stacked between another portion of the first touch folding region 130' and the second display panel 220, and the fourth insulation device 340 is stacked between the second touch region 120' and the second display panel 220.

Based on the above, in the touch panel of the disclosure, electrode structures intersected with one another are not disposed in the touch folding regions. As a result, even if the touch panel is used under repeated bending or folding, the electrode structures can be less readily damaged, such that the touch panel has better durability. More specifically, since the touch panel further includes a plurality of compensation electrodes in the touch folding regions and the sub-electrodes are staggered with one another, the effect of good touch sensing can be achieved, and the stability of the touch sensing thereof can be increased. Moreover, since electrodes are not disposed between the plurality of compensation electrodes in the touch folding regions of the touch panel, the electrode structures in the touch folding regions may are less readily damaged when the touch panel is used under repeated bending or folding, such that the touch panel has better durability. Moreover, the disclosure further provides the disposition of a plurality of touch folding regions, which can effectively improve the convenience of use of the touch panel.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch panel, comprising:
a substrate comprising a first touch region, a second touch region, and a first touch folding region, wherein the first touch folding region is disposed between the first touch region and the second touch region;
a plurality of first electrodes and a plurality of second electrodes disposed in the first touch region on the substrate, wherein the first electrodes and the second electrodes are intersected with one another, and the first electrodes are extended from the first touch region to the first touch folding region; and
a plurality of third electrodes and a plurality of fourth electrodes disposed in the second touch region on the substrate, wherein the third electrodes and the fourth electrodes are intersected with one another, and the third electrodes are extended from the second touch region to the first touch folding region,
the first electrodes and the third electrodes are not intersected with one another, and a ratio of any side length of the touch panel to a distance between the first touch region and the second touch region is between 9.5 and 95,
wherein each of the first electrodes and each of the third electrodes are staggered with one another in the first touch folding region.

2. The touch panel of claim 1, wherein each of the first electrodes further contains at least one first sub-electrode in the first touch folding region, and the at least one first sub-electrode is extended from the first electrode toward the adjacent third electrodes,
each of the third electrodes further contains at least one third sub-electrode in the first touch folding region, and the at least one third sub-electrode is extended from the third electrode toward the adjacent first electrodes.

3. The touch panel of claim 2, wherein the first sub-electrodes and the third sub-electrodes are staggered with one another.

4. The touch panel of claim 1, further comprising a first compensation electrode disposed in the first touch folding region and between the first electrodes and the third electrodes.

5. The touch panel of claim 4, wherein the first compensation electrode further contains a plurality of first compensation sub-electrodes, a portion of the first compensation sub-electrodes is extended from the first compensation electrode toward a direction of the first touch region and is between the adjacent first electrodes, and another portion of the first compensation sub-electrodes is extended from the first compensation electrode toward a direction of the second touch region, and is between the adjacent third electrodes.

6. The touch panel of claim 5, wherein each of the first electrodes further contains at least one first sub-electrode in the first touch folding region, and each of the first compensation sub-electrodes is between the at least one first sub-electrode and each of the first electrodes, each of the third electrodes further contains at least one third sub-electrode in the first touch folding region, and each of the first compensation sub-electrodes is between the at least one third sub-electrode and each of the third electrodes.

7. The touch panel of claim 6, wherein each of the first compensation sub-electrodes further contains a plurality of second compensation sub-electrodes, a portion of the second compensation sub-electrodes is extended from each of the first compensation sub-electrodes toward a direction of the first sub-electrode and each of the first electrodes, and is between the adjacent first sub-electrode and each of the first electrodes, another portion of the second compensation sub-electrodes is extended from each of the first compensation sub-electrodes toward a direction of the third sub-electrode and each of the third electrodes, and is between the adjacent third sub-electrode and each of the third electrodes.

8. The touch panel of claim 7, wherein each of the first electrodes further contains a plurality of second sub-electrodes in the first touch folding region, a portion of the second sub-electrodes is extended from each of the first electrodes toward a direction of the adjacent first compensation sub-electrodes, and another portion of the second sub-electrodes is extended from each of the first sub-electrodes toward a direction of the first compensation sub-electrodes, each of the third electrodes further contains a plurality of fourth sub-electrodes in the first touch folding region, a portion of the fourth sub-electrodes is extended from each of the second electrodes toward the direction of the adjacent first compensation sub-electrodes, and another portion of the fourth sub-electrodes is extended from each of the second sub-electrodes toward the direction of the first compensation sub-electrodes.

9. The touch panel of claim 8, wherein each of the second sub-electrodes and each of the second compensation sub-electrodes are staggered with one another, and each of the fourth sub-electrodes and each of the second compensation sub-electrodes are staggered with one another.

10. The touch panel of claim 4, further comprising a second compensation electrode disposed in the first touch folding region and between the first compensation electrode and the third electrodes.

11. The touch panel of claim 10, wherein the first compensation electrode further contains a plurality of first compensation sub-electrodes, and each of the first compensation sub-electrodes is extended from the first compensation electrode toward the first touch region and is between the adjacent first electrodes, the second compensation electrode further contains a plurality of third compensation sub-electrodes, and each of the third compensation sub-electrodes is extended from the second compensation electrode toward the second touch region and is between the adjacent third electrodes.

12. The touch panel of claim 11, wherein each of the first electrodes further contains at least one first sub-electrode in the first touch folding region, and each of the first compensation sub-electrodes is between each of the first sub-electrodes and each of the first electrodes, each of the third electrodes further contains at least one third sub-electrode in the first touch folding region, and each of the third compensation sub-electrodes is between each of the third sub-electrodes and each of the third electrodes.

13. The touch panel of claim 12, wherein each of the first compensation sub-electrodes further contains a plurality of second compensation sub-electrodes, each of the second compensation sub-electrodes is extended from each of the first compensation sub-electrodes toward a direction of each of the first sub-electrodes and each of the first electrodes, and is between each of the adjacent first sub-electrodes and each of the first electrodes, the third compensation sub-electrode further contains a plurality of fourth compensation sub-electrodes, each of the fourth compensation sub-electrodes is extended from each of the third compensation sub-electrodes toward a direction of each of the third sub-electrodes and each of the third electrodes, and is between each of the adjacent third sub-electrodes and each of the third electrodes.

14. The touch panel of claim 13, wherein each of the first electrodes further contains a plurality of second sub-electrodes in the first touch folding region, a portion of the second sub-electrodes is extended from each of the first electrodes toward the adjacent first compensation sub-electrodes, and another portion of the second sub-electrodes is extended from each of the first sub-electrodes toward the adjacent first compensation sub-electrodes, each of the third electrodes further contains a plurality of fourth sub-electrodes in the first touch folding region, a portion of the fourth sub-electrodes is extended from each of the third electrodes toward the adjacent third compensation sub-electrodes, and another portion of the fourth sub-electrodes is extended from each of the third sub-electrodes toward the adjacent third compensation sub-electrodes.

15. The touch panel of claim 14, wherein each of the second sub-electrodes and each of the second compensation sub-electrodes are staggered with one another, and each of the fourth sub-electrodes and each of the fourth compensation sub-electrodes are staggered with one another.

16. The touch panel of claim 10, wherein a distance between the first compensation electrode and the second compensation electrode is between 0.01 mm and 5 mm.

17. The touch panel of claim 1, wherein the first electrodes and the third electrodes are selected from a group consisting of a metal mesh layer, a nano-conductive material layer, a transparent conductive oxide layer, a polymer conductive layer, and a combination thereof.

18. The touch panel of claim 1, further comprising a plurality of first compensation electrodes and a plurality of second compensation electrodes disposed in the first touch folding region and between the first electrodes and the third electrodes, each of the first compensation electrodes is electrically independent of one other, and each of the second compensation electrodes is electrically independent of one other.

19. The touch panel of claim 18, wherein each of the first compensation electrodes further contains at least one first compensation sub-electrode, and the at least one first compensation sub-electrode is extended from each of the first compensation electrodes toward the direction of the first touch region and is between the adjacent first electrodes,
    each of the second compensation electrodes further contains at least one third compensation sub-electrode, and the at least one third compensation sub-electrode is extended from each of the second compensation electrodes toward the direction of the second touch region and is between the adjacent third electrodes.

20. The touch panel of claim 19, wherein each of the first electrodes further contains at least one first sub-electrode in the first touch folding region, and each of the first compensation sub-electrodes is between the at least one first sub-electrode and each of the first electrodes,
    each of the third electrodes further contains at least one third sub-electrode in the first touch folding region, and each of the third compensation sub-electrodes is between the at least one third sub-electrode and each of the third electrodes.

21. The touch panel of claim 20, wherein each of the first compensation sub-electrodes further contains a plurality of second compensation sub-electrodes, each of the second compensation sub-electrodes is extended from each of the first compensation sub-electrodes toward a direction of the first sub-electrode and each of the first electrodes, and is between the adjacent first sub-electrode and each of the first electrodes,
    each of the third compensation sub-electrodes further contains a plurality of fourth compensation sub-electrodes, each of the fourth compensation sub-electrodes is extended from each of the third compensation sub-electrodes toward a direction of the third sub-electrode and each of the third electrodes, and is between adjacent the third sub-electrode and each of the third electrodes.

22. The touch panel of claim 1, further comprising a third touch region and a second touch folding region, wherein the second touch folding region is disposed between the second touch region and the third touch region; and
    a plurality of fifth electrodes and a plurality of sixth electrodes disposed in the third touch region on the substrate, wherein the fifth electrodes and the sixth electrodes are intersected with one another, and the fifth electrodes are extended from the third touch region to the second touch folding region,
    the third electrodes are extended from the second touch region to the second touch folding region,
    wherein the third electrodes and the fifth electrodes are not intersected with one another, and a ratio of any side length of the touch panel to a distance between the second touch region and the third touch region is between 9.5 and 95.

23. The touch panel of claim 22, further comprising a fourth touch region and a third touch folding region, wherein the third touch folding region is disposed between the third touch region and the fourth touch region; and
    a plurality of seventh electrodes and a plurality of eighth electrodes disposed in the fourth touch region on the substrate, wherein the seventh electrodes and the eighth electrodes are intersected with one another, and the seventh electrodes are extended from the fourth touch region to the third touch folding region,
    the fifth electrodes are extended from the third touch region to the third touch folding region,
    the fifth electrodes and the seventh electrodes are not intersected with one another, and a ratio of any side length of the touch panel to a distance between the third touch region and the fourth touch region is between 9.5 and 95.

24. The touch panel of claim 1, further comprising a third touch region and a second touch folding region, wherein the second touch folding region and the first touch folding region are intersected with one another, and the second touch folding region is disposed between the second touch region and the third touch region; and
    a plurality of fifth electrodes and a plurality of sixth electrodes disposed in the third touch region on the substrate, wherein the fifth electrodes and the sixth electrodes are intersected with one another, the fifth electrodes are extended from the third touch region to the first touch folding region, and the sixth electrodes are extended from the third touch region to the second touch folding region,
    the fourth electrodes are extended from the second touch region to the second touch folding region,
    wherein the fourth electrodes and the sixth electrodes are not intersected with one another, the first electrodes and the fifth electrodes are not intersected with one another, and a ratio of any side length of the touch panel to a distance between the second touch region and the third touch region is between 9.5 and 95.

25. The touch panel of claim 24, further comprising a fourth touch region and a third touch folding region, wherein the third touch folding region and the first touch folding region are intersected with one another, and the third touch folding region is disposed between the first touch region and the fourth touch region; and
    a plurality of seventh electrodes and a plurality of eighth electrodes disposed in the fourth touch region on the substrate, wherein the seventh electrodes and the eighth electrodes are intersected with one another, the seventh electrodes are extended from the fourth touch region to the first touch folding region, and the eighth electrodes are extended from the fourth touch region to the third touch folding region,
    the second electrodes are extended from the first touch region to the third touch folding region,
    the second electrodes and the eighth electrodes are not intersected with one another, the fifth electrodes and the seventh electrodes are not intersected with one another, and a ratio of any side length of the touch panel to a distance between the first touch region and the fourth touch region is between 9.5 and 95.

26. The touch panel of claim 1, wherein the first touch folding region further comprises at least one non-touch region.

* * * * *